(12) United States Patent
Toda

(10) Patent No.: US 11,595,543 B2
(45) Date of Patent: Feb. 28, 2023

(54) IMAGE FORMING APPARATUS, CONTROL METHOD, AND STORAGE MEDIUM, COOPERATING WITH BLOCKCHAIN SERVICE TO VERIFY A PRINTED PRODUCT

(71) Applicant: CANON KABUSHIKI KAISHA, Tokyo (JP)

(72) Inventor: Myoshi Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/546,759

(22) Filed: Dec. 9, 2021

(65) Prior Publication Data

US 2022/0191344 A1   Jun. 16, 2022

(30) Foreign Application Priority Data

Dec. 11, 2020   (JP) .............................. JP2020-206317

(51) Int. Cl.
*H04N 1/32* (2006.01)
*G06F 3/12* (2006.01)

(52) U.S. Cl.
CPC ....... *H04N 1/32149* (2013.01); *G06F 3/1203* (2013.01); *G06F 3/1224* (2013.01); *G06F 3/1294* (2013.01)

(58) Field of Classification Search
CPC .................................................. H04N 1/32149
USPC ........................................................ 358/1.15
See application file for complete search history.

(56) References Cited

U.S. PATENT DOCUMENTS

2021/0073369 A1\* 3/2021 Fan .......................... G06F 21/44
2021/0303236 A1\* 9/2021 Park .......................... H04N 1/32

FOREIGN PATENT DOCUMENTS

JP          2018128823 A      8/2018

\* cited by examiner

*Primary Examiner* — Jacky X Zheng
(74) *Attorney, Agent, or Firm* — Canon U.S.A., Inc. IP Division

(57) ABSTRACT

An image forming apparatus generates embedded information for uniquely identifying a page, for each page of a document, prints the document while embedding the embedded information into the document, and registers a set of pieces of the embedded information in a blockchain service. The image forming apparatus thereby verifies whether the printed product is a correct printed product.

10 Claims, 30 Drawing Sheets

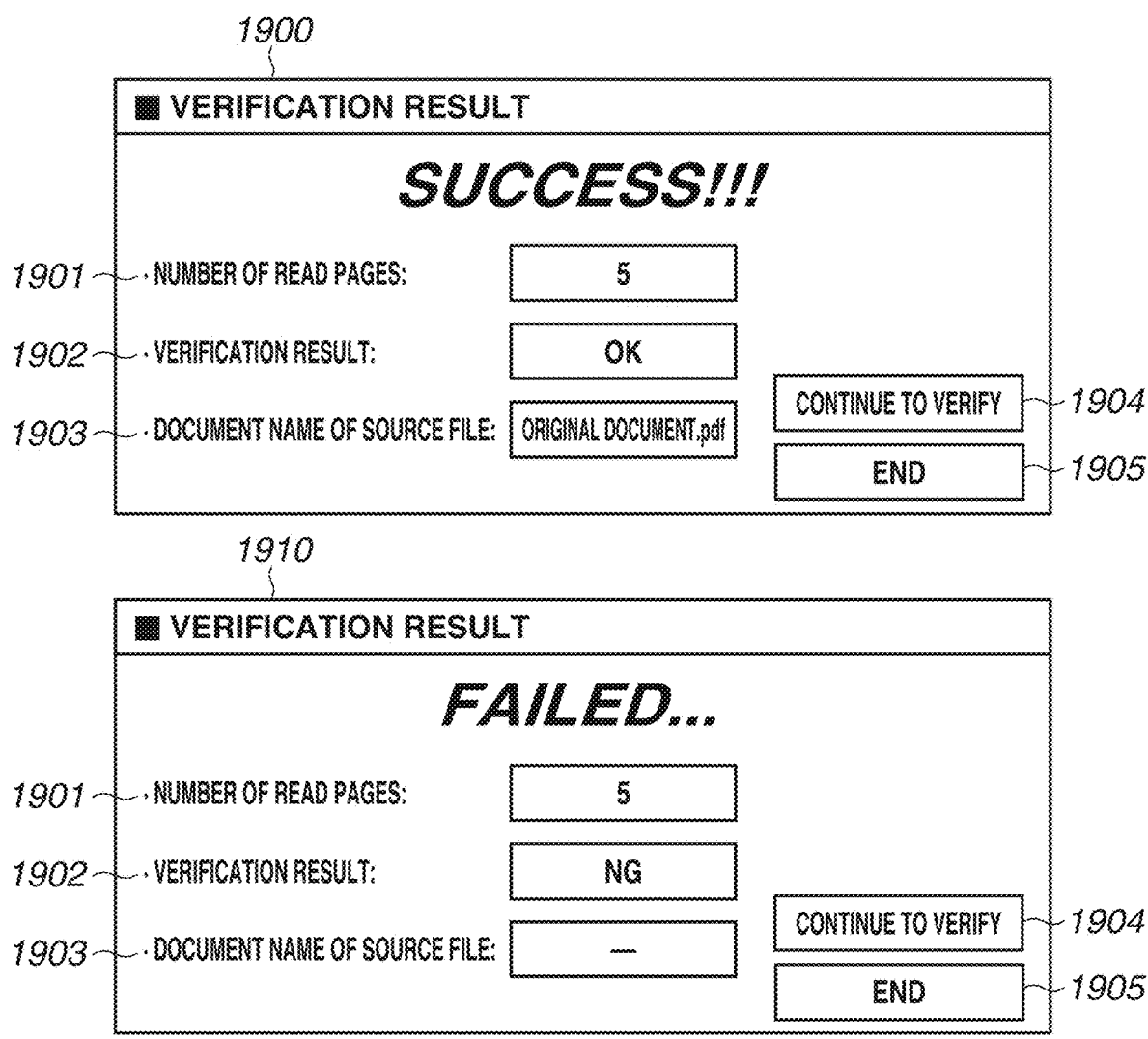

FIG.19B
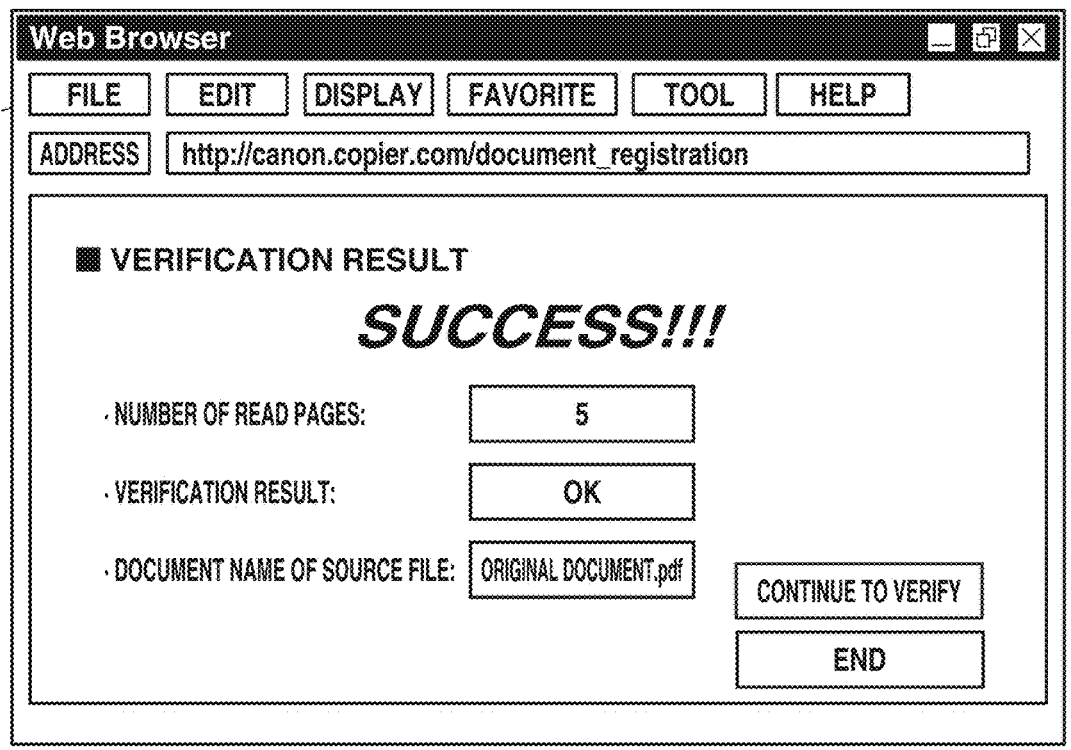
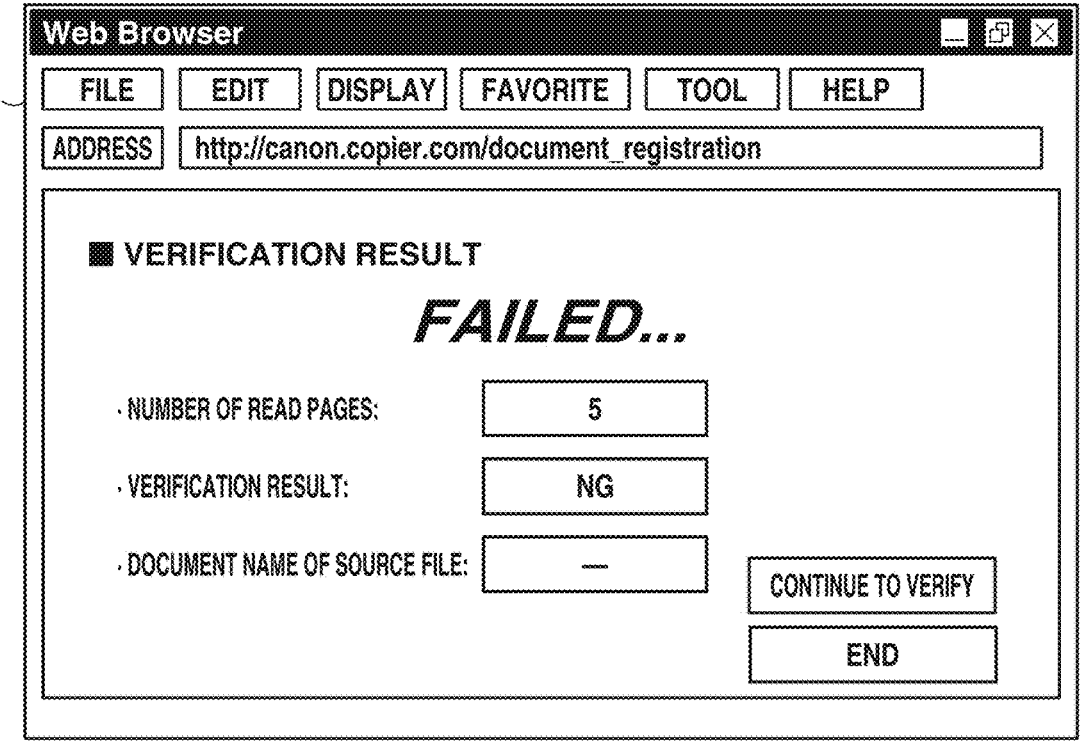

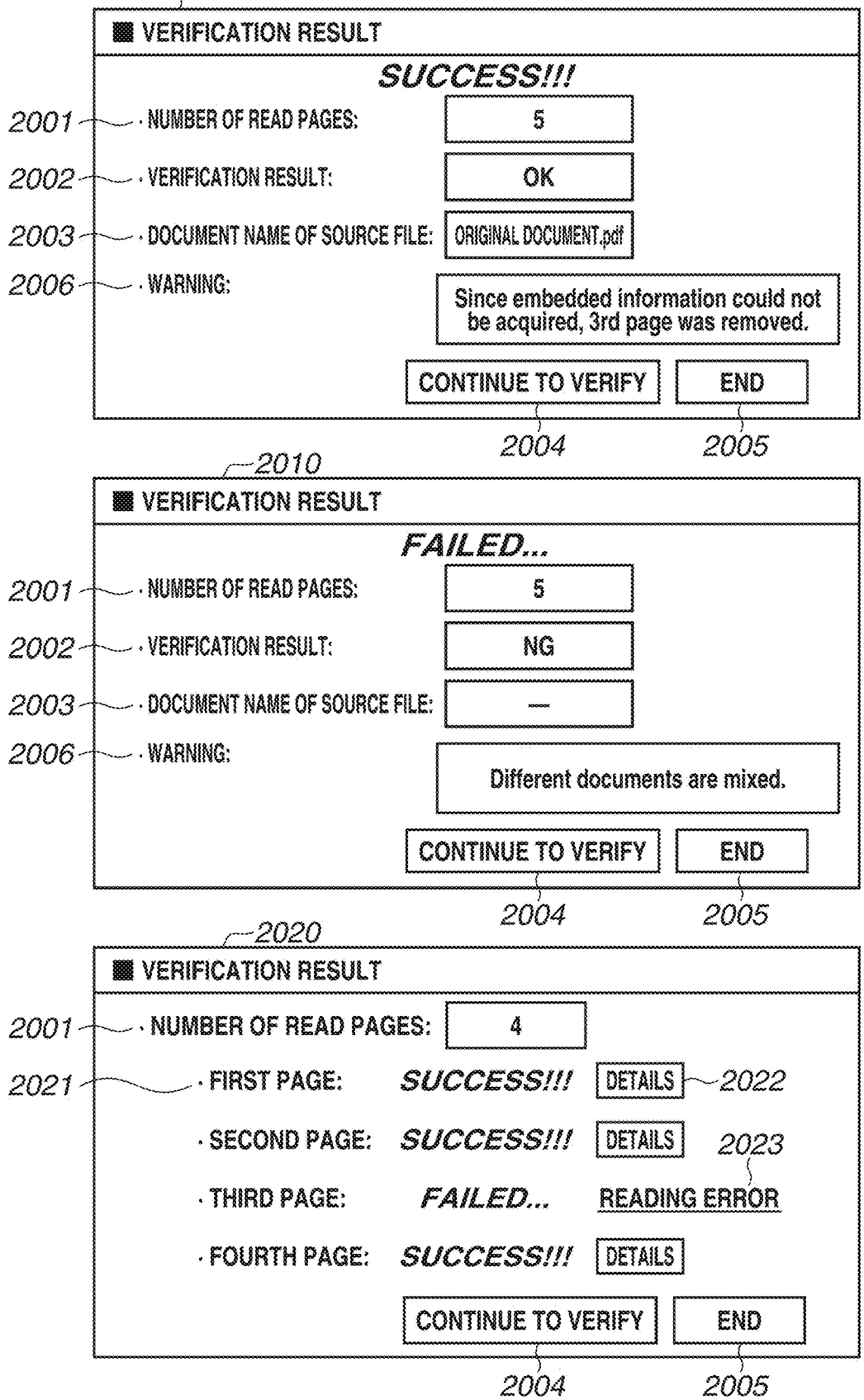

FIG.20A2
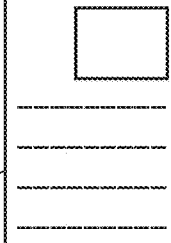
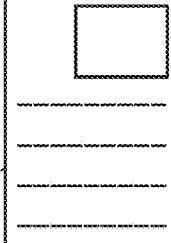
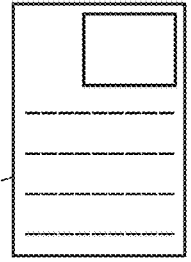

Web Browser

FILE | EDIT | DISPLAY | FAVORITE | TOOL | HELP

ADDRESS: http://canon.copier.com/document_registration

■ VERIFICATION RESULT  *SUCCESS!!!*

- NUMBER OF READ PAGES: 5
- VERIFICATION RESULT: OK
- DOCUMENT NAME OF SOURCE FILE: ORIGINAL DOCUMENT.pdf Since embedded information could not be acquired, 3rd page was removed.

[CONTINUE TO VERIFY] [END]

2070

Web Browser

FILE | EDIT | DISPLAY | FAVORITE | TOOL | HELP

ADDRESS: http://canon.copier.com/document_registration

■ VERIFICATION RESULT  *FAILED...*

- NUMBER OF READ PAGES: 5
- VERIFICATION RESULT: NG
- DOCUMENT NAME OF SOURCE FILE: —

Different documents are mixed.

[CONTINUE TO VERIFY] [END]

FIG.20B2
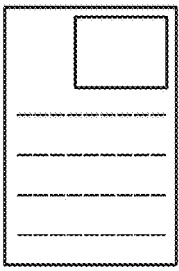

IMAGE FORMING APPARATUS, CONTROL METHOD, AND STORAGE MEDIUM, COOPERATING WITH BLOCKCHAIN SERVICE TO VERIFY A PRINTED PRODUCT

BACKGROUND

Field of the Disclosure

The present disclosure relates to a technique for coping with tampering of electronic data using a blockchain.

Description of the Related Art

There has been a known technique to guarantee the reliability of contents of electronic files by using a blockchain to prevent tampering of the electronic files (refer to Japanese Patent Application Laid-Open No. 2018-128823).

An electronic file is involved when an image forming apparatus including a scanner and a printer performs scanning or printing. A case is considered where information regarding such an electronic file is registered in a blockchain service. Nevertheless, it is not considered how the image forming apparatus cooperates with the blockchain service.

SUMMARY

Some embodiments of the present disclosure are directed to causing an image forming apparatus to cooperate with a blockchain service, thereby enabling authenticity to be guaranteed using the blockchain service for a printed product having a plurality of pages.

According to an aspect of the present disclosure, an image forming apparatus cooperates with a management service for receiving a document via a network and storing the document, and a blockchain service for managing information regarding the document in a block unit and managing a plurality of blocks at a plurality of nodes after defining relation with a previous and/or subsequent block for each block. The image forming apparatus includes a generation unit, a printing unit, a registration unit, and a document verification unit. The generation unit generates, when a document stored in the management service is printed, embedded information for uniquely identifying a page, for each page of the document, and further generates an embedded image from the embedded information. The printing unit outputs a printed product by performing printing while embedding the embedded image into each page of the document. The registration unit registers information regarding the printed product in the blockchain service based on a set of pieces of the embedded information. The document verification unit verifies whether the printed product is a correct printed product, by extracting embedded information by scanning the printed product and analyzing the embedded image, and inquires of the blockchain service about information regarding the printed product based on the embedded information.

Further features of various embodiments will become apparent from the following description of exemplary embodiments with reference to the attached drawings.

BRIEF DESCRIPTION OF THE DRAWINGS

FIGS. 19A and 19B each illustrate screen examples of a result display screen of the application A according to the first exemplary embodiment.

FIGS. 20A1 and 20A2 illustrate screen examples of a result display screen of the application A according to the second exemplary embodiment. FIGS. 20B1 and 20B2 illustrate screen examples of a result display screen of the application A according to the second exemplary embodiment.

DESCRIPTION OF THE EMBODIMENTS

Methods of establishing cooperation between an image forming apparatus and a blockchain service include a method of registering information regarding a printed product into the blockchain service. Specifically, the method is a method of registering information regarding an electronic file into the blockchain service, and embedding inquiry information for the blockchain service into a printed product to be actually output. With such a configuration, a person who has received the printed product extracts the inquiry information and verifies the inquiry information in the blockchain service, and thereby the person can confirm whether the authenticity of the printed product is guaranteed. The assurance of authenticity means that a printed product including a plurality of pages that has been verified by the blockchain service includes all the pages without any page being replaced or extracted from the printed pages. As described above in "Description of the Related Art", a technique of preventing tampering by registering information regarding an electronic file into a blockchain service has been known, but the authenticity of a printed product is not considered.

At this time, a printed product to be output by performing printing once based on one electronic file may have a plurality of pages. Nevertheless, if the same inquiry information is embedded into a plurality of pages, authenticity may not be correctly confirmed in some cases. For example, when a document identifier serves as inquiry information, because inquiry information remains the same, verification results of a printed product of three pages become the same between a case where the first to third pages are collectively verified, and a case where three pages copied from the first page are collectively verified. Nevertheless, the former case and the latter case are to be differentiated as the assurance of authenticity. In particular, the latter case needs to be detected as a case where authenticity is not guaranteed.

Aside from such an example, even in a case where the same electronic file is printed, a printed product is printed over two pages in some cases, or a printed product is printed over four pages in other cases. It is thus necessary to assure authenticity while differentiating between these printed products. Specifically, if a printed product printed over two pages and a printed product printed over four pages are mixedly verified, it is necessary to determine that authenticity is not guaranteed.

Some embodiments have been devised in view of the above-described problems. The object of various embodiments is to enable authenticity to be guaranteed using a blockchain service for a printed product having a plurality of pages.

Specifically, the above-described problems are solved by registering one or more pieces of information into a blockchain each time an electronic file is printed, and embedding unique information into each printed page.

Figure 1:
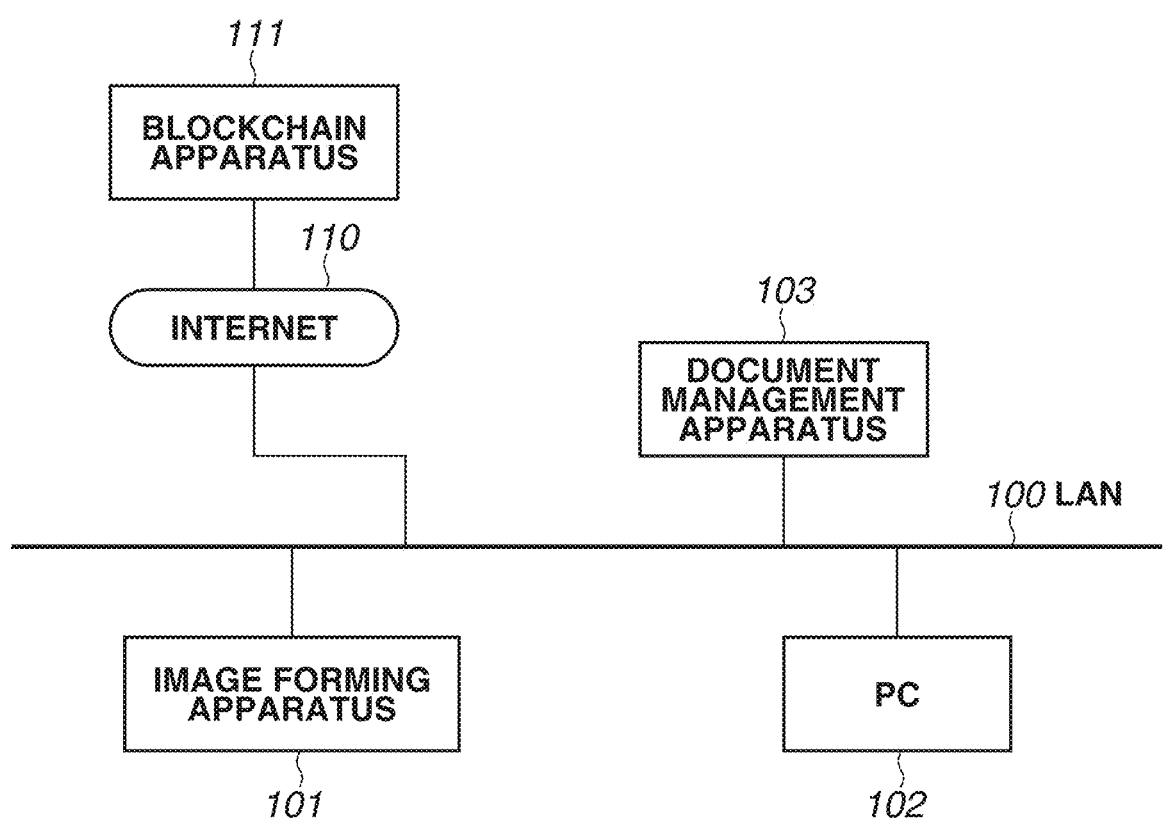
FIG. 1 is a block diagram illustrating a configuration of a system.

Hereinafter, exemplary embodiments for solving these various problems will be described with reference to the drawings. FIG. 1 is an overall view of a system related to an image forming apparatus 101 according to a first exemplary embodiment. The image forming apparatus 101, a personal computer (PC) 102, and a document management apparatus 103 are connected to a local area network (LAN) 100, exist in an intranet, and communicate with a blockchain apparatus 111 via the Internet 110.

The PC 102 is used for the management of the image forming apparatus 101 using a web browser, and printing of the image forming apparatus 101 using a printer driver.

The blockchain apparatus 111 is an apparatus configured to manage information regarding documents generated by the image forming apparatus 101 or the PC 102, collectively for each block. The blockchain apparatus 111 is an apparatus configured to provide a blockchain service for assuring the validity of a document. The document management apparatus 103 is an apparatus configured to store electronic documents generated by the image forming apparatus 101 or the PC 102, and to provide a document management service. The services provided by the blockchain apparatus 111 and the document management apparatus 103 may be provided as cloud services. In such a case, a service may be provided by one apparatus formed by virtualizing a plurality of computers.

Figure 2:
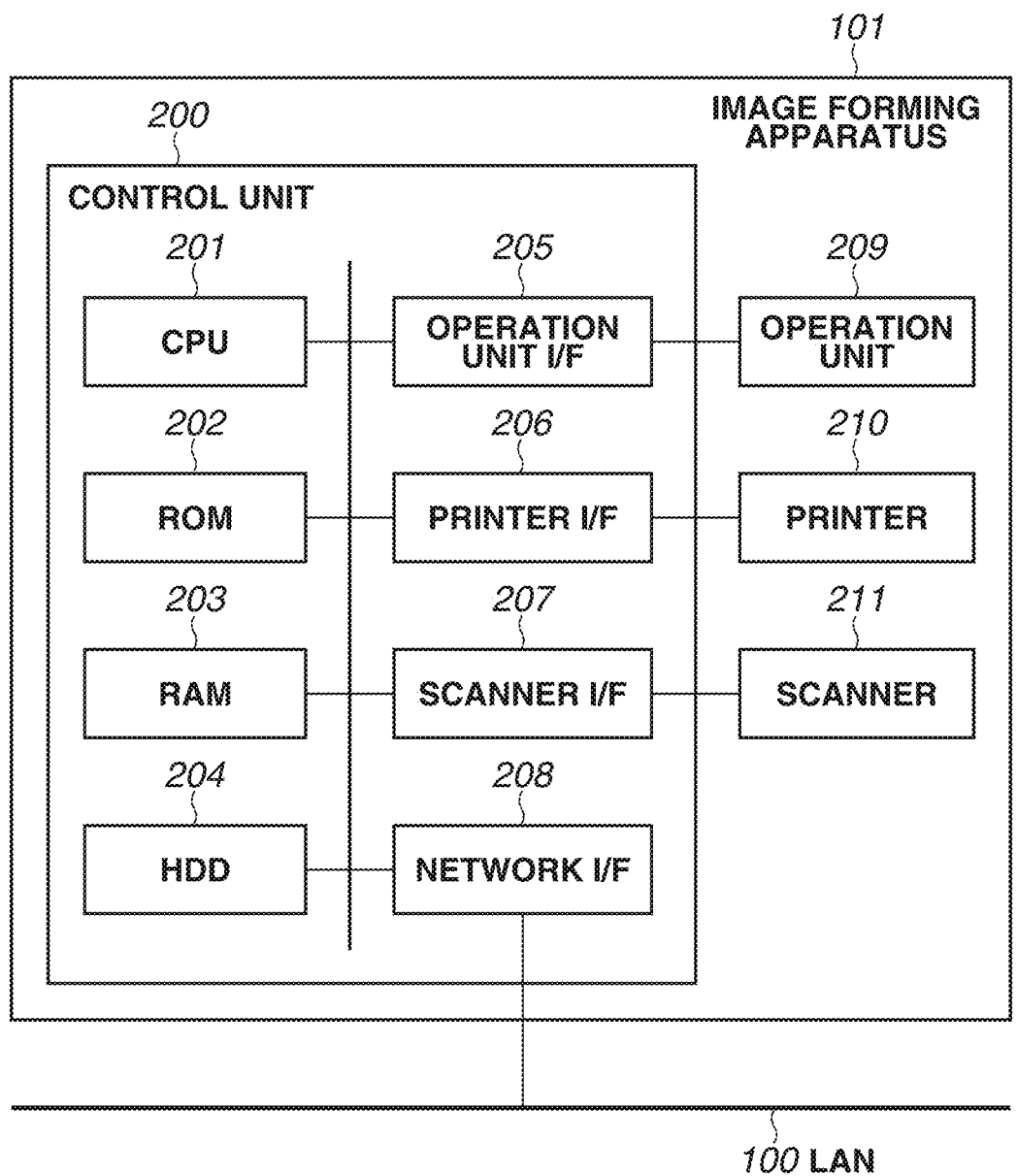
FIG. 2 is a block diagram illustrating a hardware configuration of an image forming apparatus.

FIG. 2 is a block diagram illustrating a hardware configuration of the image forming apparatus 101. A control unit 200 including a central processing unit (CPU) 201 controls operations of the entire image forming apparatus 101. The CPU 201 performs various types of control, such as reading control and transmission control, by reading out a control program stored in a read only memory (ROM) 202. A random access memory (RAM) 203 is used as a temporary storage region, such as a main memory and a work area, of the CPU 201. A hard disc drive (HDD) 204 stores image data, various programs, or various types of data described below. The image forming apparatus 101 includes a hardware configuration as an information processing apparatus. In addition to the hardware configuration as an information processing apparatus, the image forming apparatus 101 further includes the following hardware configuration.

An operation unit interface (I/F) 205 connects an operation unit 209 and the control unit 200. A printer I/F 206 connects a printer 210 and the control unit 200. Image data to be printed by the printer 210 is transferred from the control unit 200 via the printer I/F 206, and printed onto a recording medium by the printer 210. A scanner I/F 207 connects a scanner 211 and the control unit 200. The scanner 211 generates image data by reading an image on a document, and inputs the read image data to the control unit 200 via the scanner I/F 207. A network I/F 208 connects the control unit 200 (the image forming apparatus 101) to the LAN 100. The network I/F 208 transmits image data and information to an external apparatus on the LAN 100. The network I/F 208 also receives various types of information from an external apparatus on the LAN 100.

Figure 3:
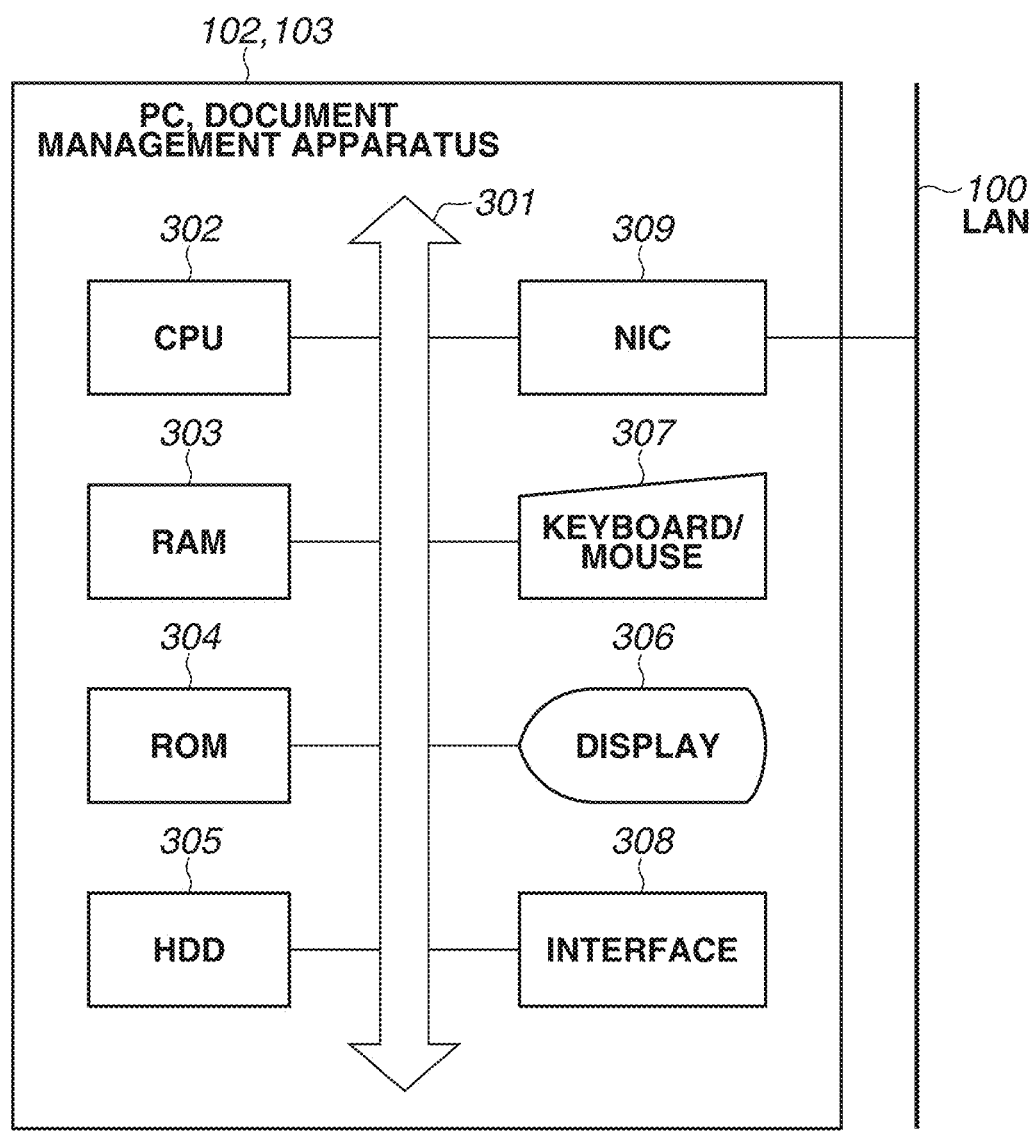
FIG. 3 is a block diagram illustrating a hardware configuration of a personal computer (PC) and a document management apparatus.

FIG. 3 is a block diagram illustrating a hardware configuration of a computer of the PC 102 and the document management apparatus 103. A CPU 302 controls the entire apparatus. The CPU 302 executes an application program and an operating system (OS) stored in an HDD 305, and temporarily controls storing information and files that are necessary for the execution of programs, into a RAM 303. A ROM 304 is a storage unit, and stores various types of data, such as a basic input-output (I/O) program. The RAM 303 is a temporary storage unit, and the RAM 303 functions as a main memory and a work area of the CPU 302.

The HDD 305 is one of external storage units. The HDD 305 functions as a large-capacity memory, and stores an application program, such as an office application and a web browser, an OS, and a related program.

A display 306 is a display unit that displays a command input from a keyboard/mouse 307 serving as an instruction input unit. An interface 308 is an external apparatus I/F. The interface 308 connects a printer, a universal serial bus (USB) device, and a peripheral device. A system bus 301 controls a flow of data in the apparatus. A network interface card (hereinafter, "NIC") 309 exchanges data with an external apparatus via the LAN 100.

The configuration of the information processing apparatus is an example, and is not limited to the configuration examples illustrated in FIGS. 2 and 3. For example, a storage location of data and programs can be changed between the ROM 304, the RAM 303, and the HDD 305 depending on the feature of the data and programs. Unless otherwise expressly stated in the present exemplary embodiment, various types of processing are implemented by the CPU 302 loading programs stored in the ROM 304, onto the RAM 303, and executing the programs.

Figure 4:
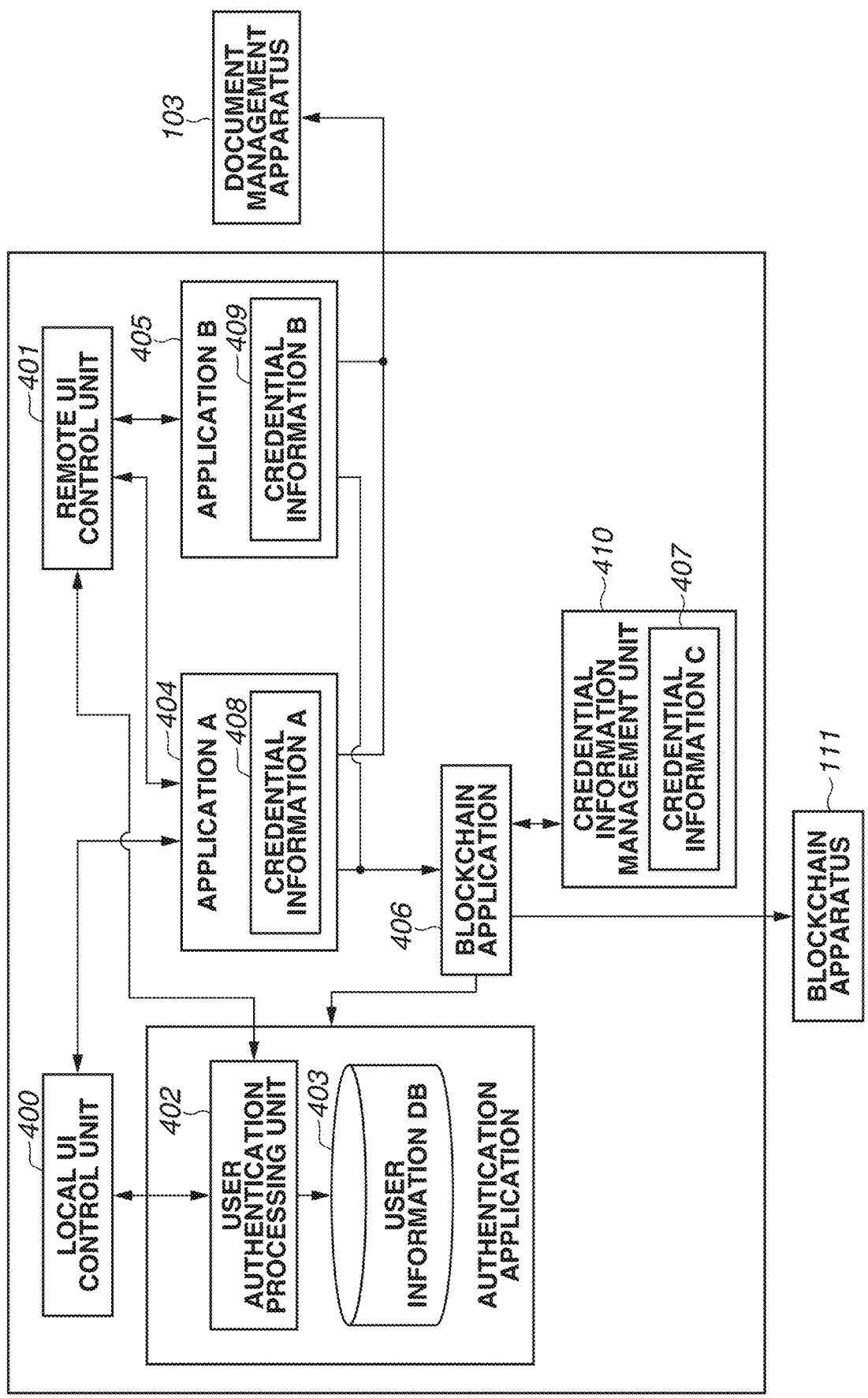
FIG. 4 is a block diagram illustrating a software configuration of the image forming apparatus.
Figure 15A:
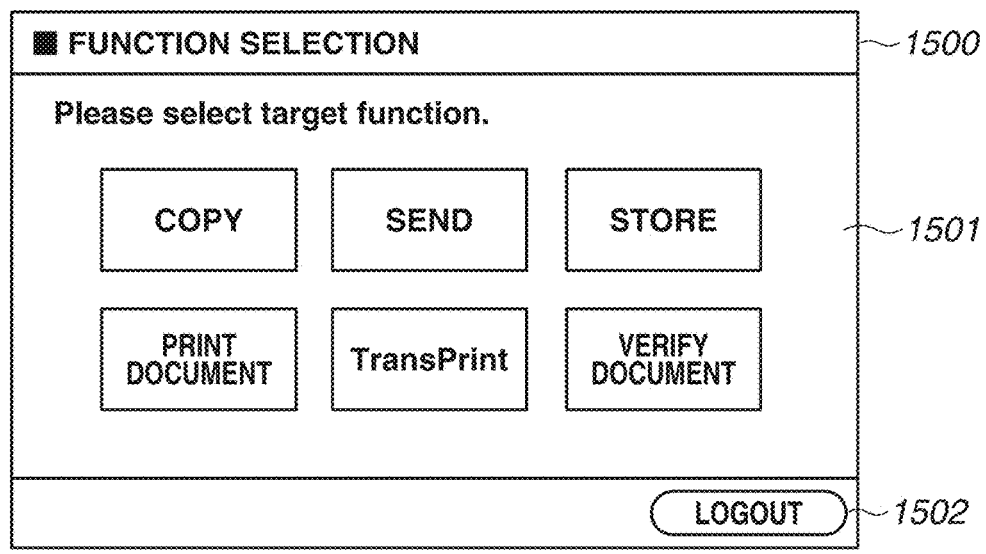
FIGS. 15A and 15B each illustrate a screen example of a function selection screen.

FIG. 4 is a block diagram illustrating a software configuration of the image forming apparatus 101 according to some embodiments. Unless otherwise stated, each processing unit is a software function to be implemented by the CPU 201 loading a control program stored in the ROM 202, onto the RAM 203, and executing the control program. A local user interface (UI) control unit 400 provides a function of controlling the operation unit 209 via the operation unit I/F 205. The local UI control unit 400 notifies a user authentication processing unit 402 and an application of an operation performed by the user using the operation unit 209. The local UI control unit 400 displays a function selection screen 1500 on the operation unit 209. FIG. 15A illustrates an example of the function selection screen 1500. The local UI control unit 400 receives a screen display request from the user authentication processing unit 402 or an application, and performs control for displaying a screen on the operation unit 209. The user authentication processing unit 402 and an application A 404 display a screen on the operation unit 209 via the local UI control unit 400.

Figure 15B:
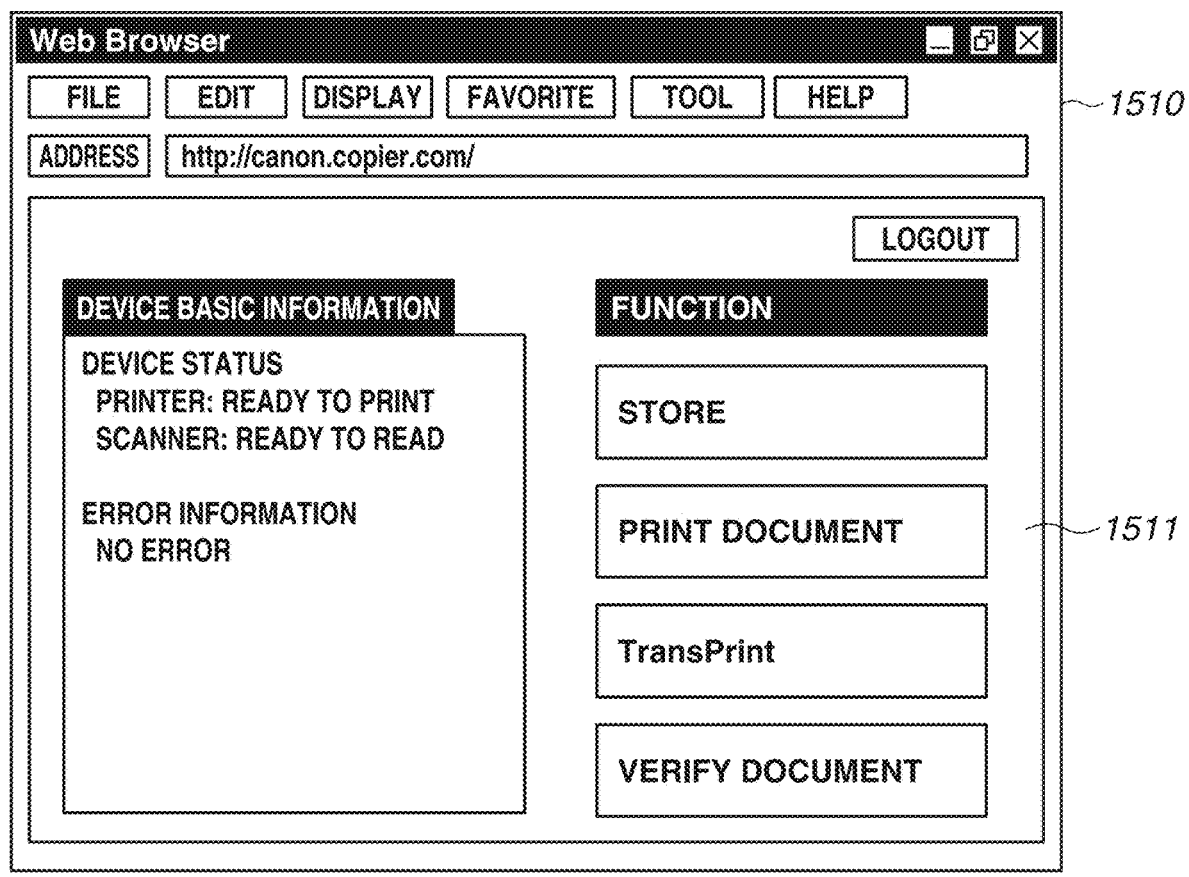

A remote UI control unit 401 provides a web page to a web browser on the PC 102 via the network I/F 208. The remote UI control unit 401 notifies the user authentication processing unit 402 and the application of an operation performed by the user via the web browser. The remote UI control unit 401 displays a function selection screen 1510 on the web browser on the PC 102. FIG. 15B illustrates an example of the function selection screen 1510. The remote UI control unit 401 receives a request from the user authentication processing unit 402 or the application, and performs control for displaying a web page on the web browser. The user authentication processing unit 402, the application A 404, and an application B 405 display a web page on the web browser via the remote UI control unit 401.

Figure 13A:
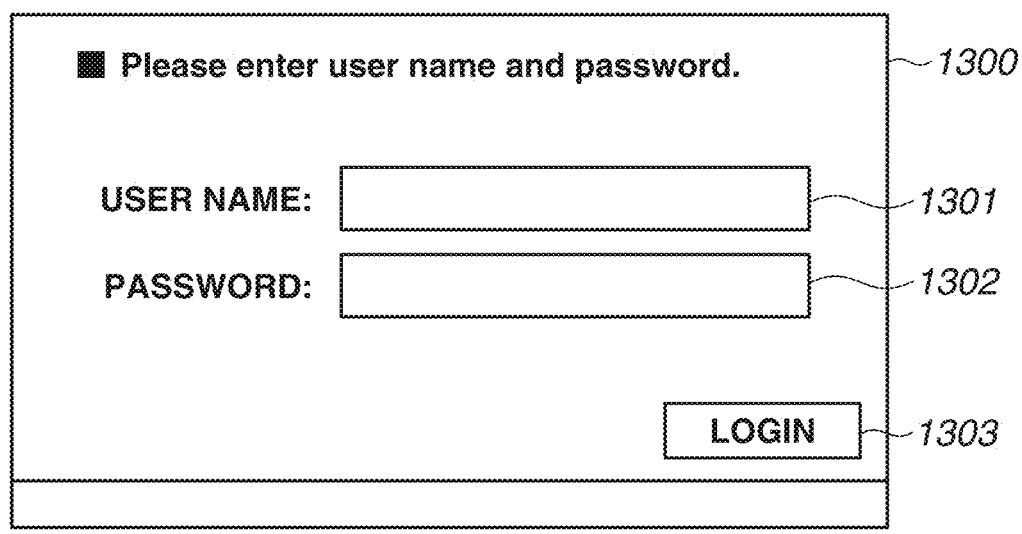
FIGS. 13A and 13B each illustrate a screen example of an authentication screen.

The user authentication processing unit 402 provides a function for authenticating a user who uses the image forming apparatus 101. The user authentication processing unit 402 thus displays an authentication screen 1300 (screen example is illustrated in FIG. 13A) on the operation unit 209. The user authentication processing unit 402 receives authentication information, such as a user name and a password, from the user via the authentication screen 1300, and performs user authentication by comparing the received authentication information with user information held in a user information DB 403.

The user information DB 403 provides a function of holding user information being information regarding a user who uses the image forming apparatus 101. The user information DB 403 is implemented in the HDD 204, and information is stored in the HDD 204. Table 1 lists examples of information stored in the user information DB 403.

TABLE 1

| User Name | Password | Role |
|---|---|---|
| UserA | **** | Administrator |
| UserB | **** | General User |
| Guest | — | Guest User |

A user information table indicated as Table 1 includes "user name", "password", and "role". Authentication information and a role are associated. The "user name" indicates a name for uniquely identifying a user. The "password" indicates a password to be used in user authentication, and an arbitrary value can be set for each user. The "role" indicates a utilization right of the image forming apparatus 101 that is granted to a user of the image forming apparatus 101. In the present exemplary embodiment, there are three roles included, such as Administrator, General User, and Guest User exist.

The Administrator is a role to be allocated to an administrator user of the image forming apparatus 101. The General User is a role to be allocated to a general user who uses the image forming apparatus 101. The Guest User is a role to be allocated to a user whose access to functions is desired to be restricted. The Guest User is a role to be allocated in a case where the user uses a function without registering authentication information, such as a user name and a password, into the user information DB 403.

The application A 404 provides a function of converting a scanned document into an electronic document, registering information regarding a document into the blockchain apparatus 111 via a blockchain application 406, and registering the document into the document management apparatus 103. The application A 404 provides a function of receiving and printing the registered document via the printer I/F 206. In the present exemplary embodiment, a document will be described as an example of a printed product. However, a printed product other than a document can also be similarly treated. The application A 404 controls the scanner 211 via the scanner I/F 207 and transmits data to the LAN 100 via the network I/F 208, thereby transmitting scan data to an external apparatus. The application A 404 provides screen information to the local UI control unit 400 and the remote UI control unit 401.

Figure 16A:
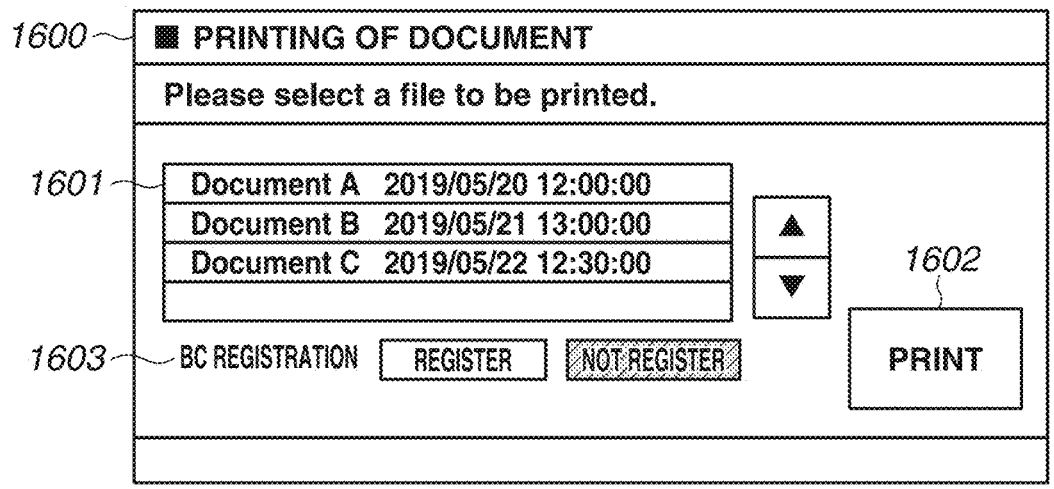
FIGS. 16A and 16B each illustrate a screen example of a document printing screen of an application A.
Figure 17A:
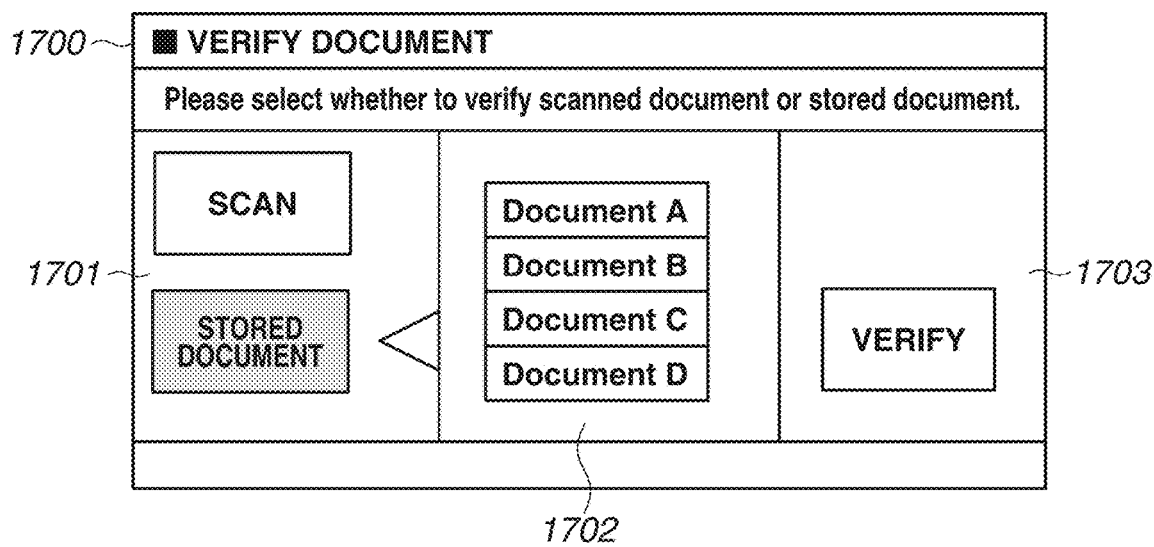
FIGS. 17A and 17B each illustrate a screen example of a document verification screen of the application A according to the first exemplary embodiment.

The application A 404 accepts input to a screen displayed on the operation unit 209 via the local UI control unit 400, and performs processing in accordance with the input. The application A 404 displays a printing screen 1600 and a verification screen 1700 on the operation unit 209. FIG. 16A illustrates an example of the printing screen 1600, and FIG. 17A illustrates an example of the verification screen 1700.

The application A 404 also accepts input to the web browser on the PC 102 via the remote UI control unit 401, and performs processing in accordance with the input. The application A 404 displays a printing screen 1610 and a verification screen 1710 on the web browser on the PC 102.

Figure 16B:
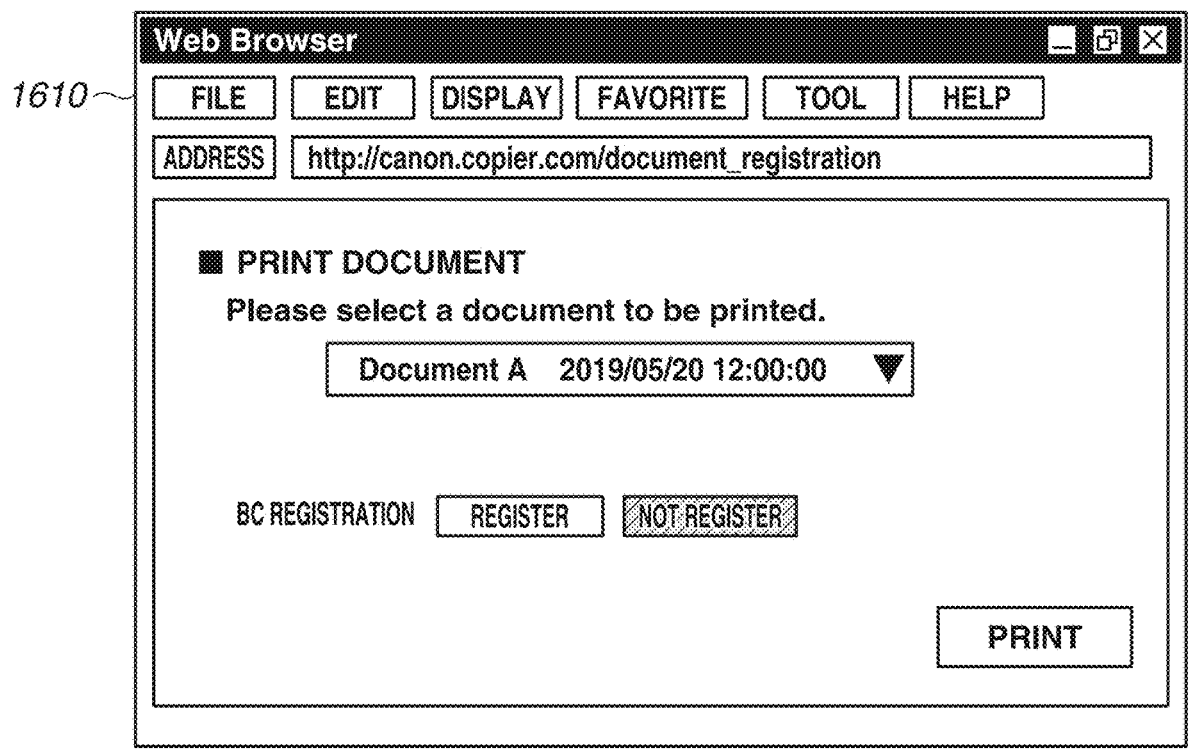
Figure 17B:
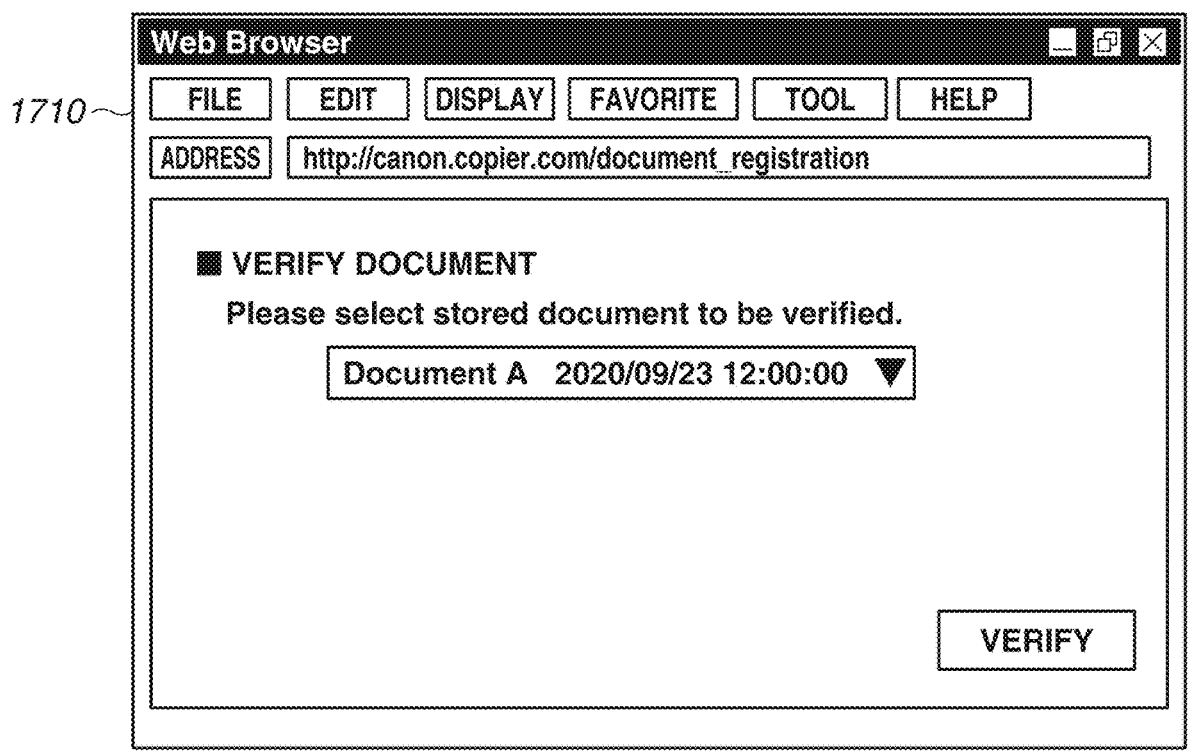

FIG. 16B illustrates an example of the printing screen 1610, and FIG. 17B illustrates an example of the verification screen 1710.

The description will be given of an example in which one application has functions, such as document printing and verification, but a plurality of applications may share these functions. For example, the functions are considered to be shared in such a manner that a scan application performs registration of a document and a printing application performs printing.

Similarly to the application A 404, the application B 405 provides a function of converting a scanned document into an electronic document, registering document information into the blockchain apparatus 111 via the blockchain application 406, and registering a document into the document management apparatus 103. The application B 405 provides screen information to the remote UI control unit 401. The application A 404 and the application B 405 are different in that the application A 404 handles input-output from both of a local UI and a remote UI via the local UI control unit 400 and the remote UI control unit 401, but the application B 405 handles input-output only from a remote UI. The application A 404 and the application B 405 do not directly communicate with the blockchain apparatus 111.

Nevertheless, this is not applied to a case where functions of the blockchain application 406 are integrated into these applications.

Figure 10:
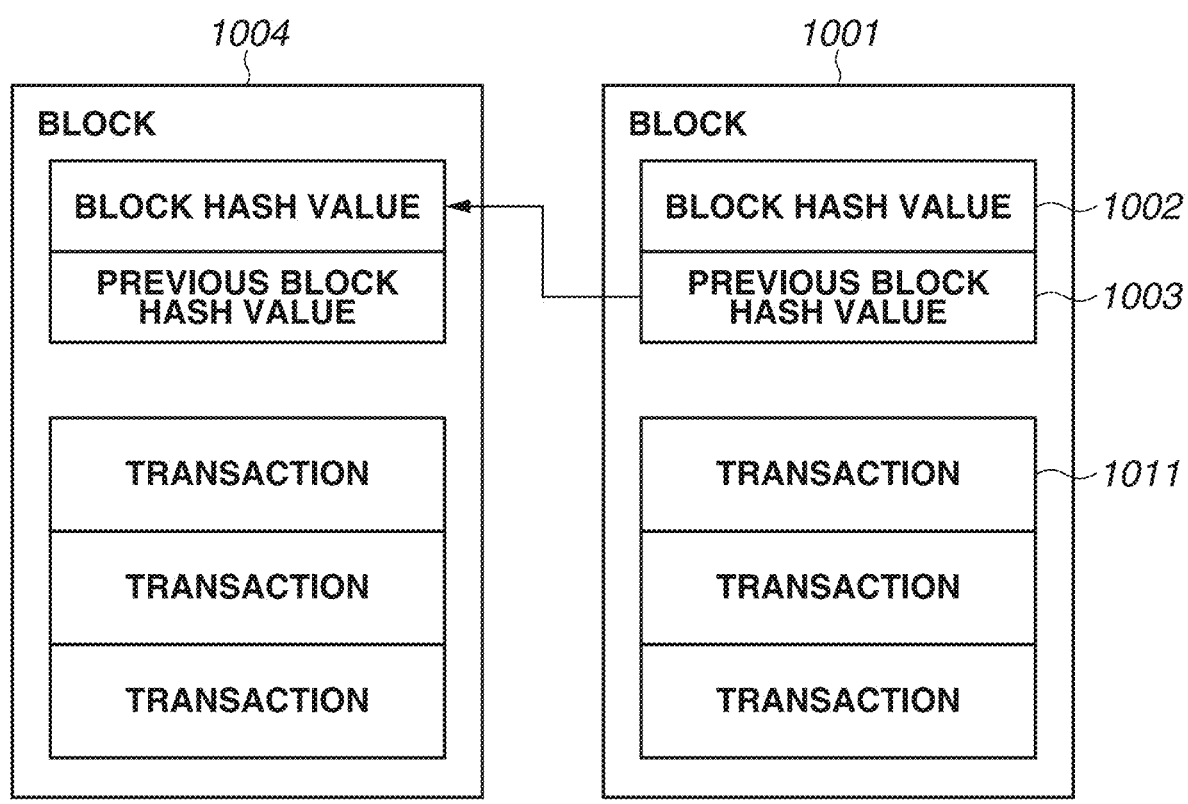
FIG. 10 is a diagram illustrating a data structure of a blockchain apparatus.

The blockchain application 406 is an application for blockchain cooperation, and provides a function of receiving an instruction from the application A 404 or the application B 405, registering information regarding a document into the blockchain apparatus 111, and verifying the information regarding the document. FIG. 10 illustrates an example of a data structure of a block 1001 to be registered by the blockchain application 406 into the blockchain apparatus 111. The details will be described below.

When the blockchain application 406 receives an instruction to the blockchain apparatus 111 from an application, the blockchain application 406 also receives credential information from a credential information management unit 410. The blockchain application 406 executes processing on the blockchain apparatus 111 only in a case where verification of the received credential information is successful.

Credential information A 408 is credential information for guaranteeing that the application A 404 is a rightful application that uses the blockchain apparatus 111. The credential information A 408 is issued to an application of which the execution of correct processing is verified, and the application is installed onto the image forming apparatus 101 in a state in which the credential information is embedded.

Credential information B 409 is credential information for guaranteeing that the application B 405 is a rightful application that uses the blockchain apparatus 111. Similarly to the credential information A 408, the credential information B 409 is installed onto the image forming apparatus 101.

Credential information C 407 is credential information for guaranteeing that the image forming apparatus 101 is a rightful apparatus that uses the blockchain apparatus 111. For example, an organization operating this system may issue the credential information C 407 for each manufacturer of an apparatus. The credential information C 407 may be installed into firmware of the image forming apparatus 101 before shipment, or may be installed onto the image forming apparatus 101 after shipment.

The credential information may be a digital certificate, a pair of keys having a secret key and a public key, or a predefined data value. The type of credential information is not limited. The type of credential information may vary for each application.

The credential information management unit 410 provides a function of managing credential information in the image forming apparatus 101. In the present exemplary embodiment, the credential information management unit 410 receives an instruction from the blockchain application 406, and provides the credential information C 407 to the blockchain application 406. In the present exemplary embodiment, the PC 102 cooperates with the blockchain apparatus 111 via the image forming apparatus 101, but the credential information management unit 410 is configured not to provide the credential information C 407 to the PC 102. A user of the PC 102 is permitted to use the blockchain application 406 based on a role confirmed by the image forming apparatus 101, by logging into the image forming apparatus 101 via a remote UI. The PC 102 thereby needs not preliminarily build trust relationship with the blockchain apparatus 111.

The application A 404 and the application B 405 can execute printing in a state in which embedded information including several pieces of information is embedded into a document. Typical information included in embedded information is inquiry information required when the blockchain service is inquired of whether the document is registered. The inquiry information is only required to be information that can identify the transaction 1011 described below with reference to FIG. 10. The embedded information may include information other than the inquiry information. The embedded information needs not include the inquiry information.

In the present exemplary embodiment, a hash value (page hash value) to be uniquely allocated to each page to be printed is exemplified as information to be embedded into a document. The page hash value serving as the embedded information is then read at the time of scanning, a printed document hash value is calculated based on the page hash value, and an inquiry is made to the blockchain service using the printed document hash value as inquiry information.

Figure 5:
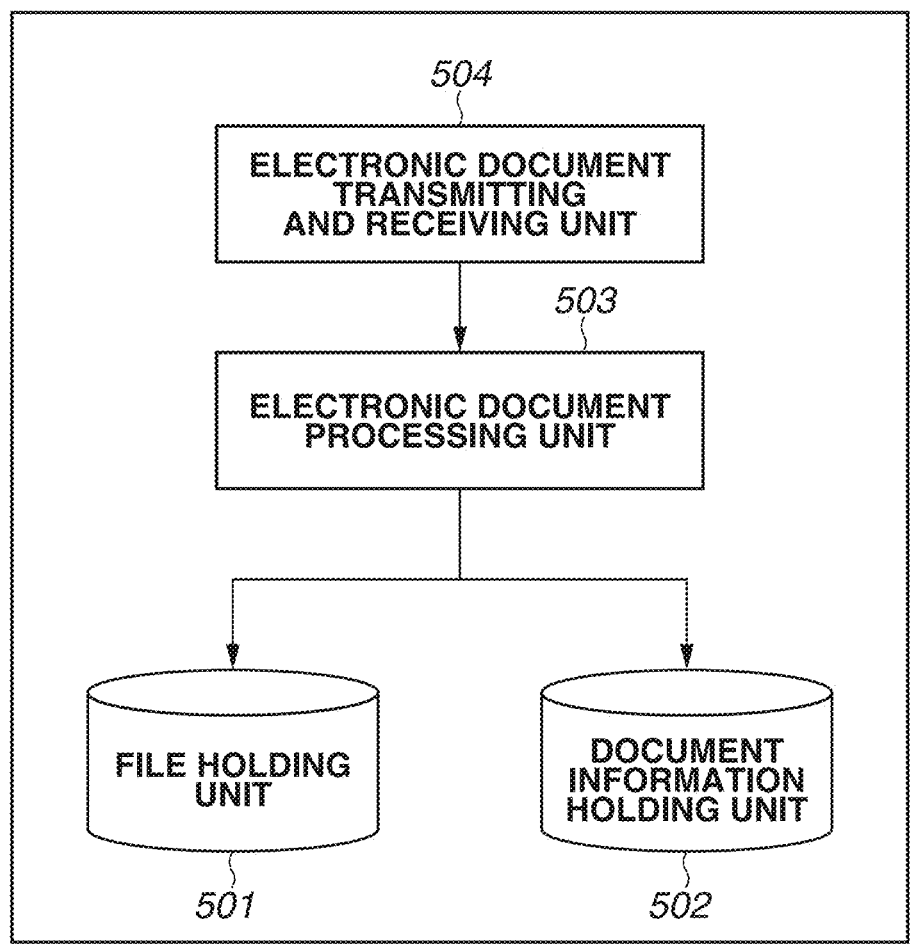
FIG. 5 is a block diagram illustrating a software configuration of the document management apparatus.

FIG. 5 is a block diagram illustrating a software configuration of the document management apparatus 103 that is related to some embodiments. An electronic document managed by the document management apparatus 103 includes a document file to be stored in a file holding unit 501, and information indicating a document stored in a document information holding unit 502. Data to be stored in the document information holding unit 502 is information listed in a document information table indicated as Table 2.

TABLE 2

| ID | Document Name | Registration Date and Time | File Path |
|---|---|---|---|
| 1 | Document A | 2020/9/23 12:00 | D:\Document\document0001.pdf |
| 2 | Document B | 2020/9/24 13:00 | D:\Document\document0002.pdf |
| 3 | Document C | 2020/9/25 12:30 | D:\Document\document0003.pdf |

The document information table indicated as Table 2 includes "ID", "document name", "registration date and time", and "file path". The "ID" indicates identification information for uniquely managing an electronic document. The "document name" indicates a name allocated for the user to identify an electronic document. The same document name may be allocated to a plurality of electronic documents. The "registration date and time" indicate date and time on which an electronic document is stored into the document management apparatus 103. The "file path" indicates a location in the file holding unit 501 in which a stored document file is stored. In the present exemplary embodiment, the "file path" is indicated as a path on a file system, but needs not be a path as long as the "file path" uniquely indicates a storage location.

These pieces pf information are minimum items necessary for describing the present exemplary embodiment, but information for classifying documents may be held together. An electronic document processing unit 503 has functions for accessing the file holding unit 501 and the document information holding unit 502, and controlling processing, such as registration and acquisition of an electronic document, and acquisition of a list. The processing in the electronic document processing unit 503 is executed by being started by an electronic document transmitting-receiving unit 504 that has received a request for input-output processing related to an electronic document from the outside of the document management apparatus 103, such as the image forming apparatus 101 and the PC 102.

FIG. 10 is a block diagram illustrating the transaction 1011 held in the blockchain apparatus 111, and a data structure of the block 1001 storing a plurality of transactions 1011. The blockchain apparatus 111 is an apparatus configured to manage data by a method called blockchain. The blockchain handles information in a unit called a transaction, and manages the transaction in a unit called a block collectively having a plurality of transactions.

Blocks are configured to keep a chained state by relation with previous and subsequent blocks being defined. The blockchain is managed by a plurality of computers called nodes, and each node performs management of identical block data. Thus, update needs to be performed in a plurality of nodes to perform tampering with block data. The blockchain is therefore known as a data management method having high tamper-resistance. As described above, the blockchain apparatus 111 is an apparatus including a plurality of computers, and a blockchain service is provided by these computers.

In the present exemplary embodiment, a correct state of a printed product is held, and the blockchain apparatus 111 is used for the guarantee of authenticity, by transmitting the transactions 1011 to the blockchain apparatus 111 at the time of document processing in the image forming apparatus 101, and performing block management. A structure of a block holding the transactions 1011 will be described using the block 1001. The structure of the block 1001 schematically illustrates a common blockchain structure. The block 1001 holds a plurality of transactions 1011, and a block hash value 1002 calculated from these transactions 1011.

In the present exemplary embodiment, the number of transactions 1011 included in the block is three, but the number of transactions is not limited. The block 1001 also holds a previous block hash value 1003 for linking blocks. In the present exemplary embodiment, a block hash value of a block 1004 is stored as the previous block hash value 1003, and this indicates that the blocks are related. In the present exemplary embodiment, a previous block hash value is managed. Alternatively, a subsequent block hash value may be managed, or both hash values of a previous block and a subsequent block may also be managed.

Figure 11:
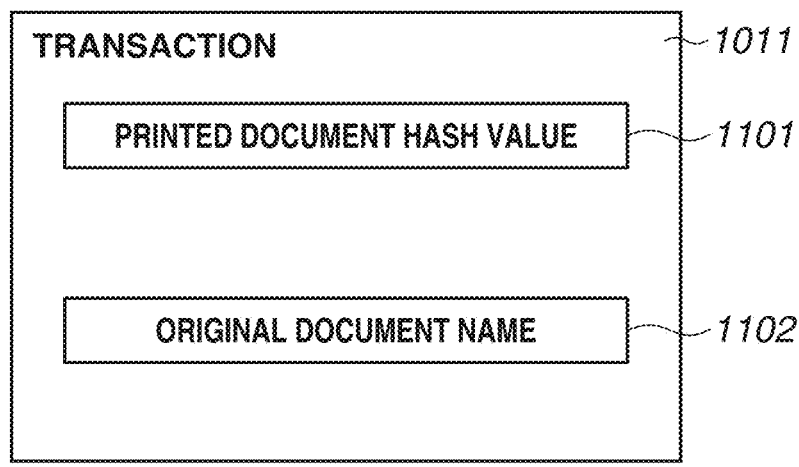
FIG. 11 is a diagram illustrating a data structure of a transaction according to the first exemplary embodiment.

FIG. 11 illustrates a data structure of the transaction 1011 according to the present exemplary embodiment. The transaction corresponds to the entire printed product including a plurality of pages, and includes a printed document hash value 1101 and an original document name 1102 as information. The printed document hash value 1101 is document identification information that is used as inquiry information in the blockchain service, and used as information for verifying that all pages of the printed product are included.

Specifically, the printed document hash value 1101 is a hash value calculated by combining page hash values each being a unique hash value allocated to each page to be printed. A combining method and a calculation method are not specifically limited. Nevertheless, the calculation of the printed document hash value 1101 is also performed in verification of authenticity. Thus, similar methods need to be used in printing and verification, and the same printed document hash value needs to be calculated from the same page hash values. In a case of a printed product having one page, a method of omitting the combining and calculation by setting a page hash value and a printed document hash value to the same value is also considered. However, this method is not considered in the present exemplary embodiment, and a calculation method of a printed document hash value does not depend on the number of pages. Because a hash value serves as key information for identifying the transaction 1011 on the blockchain, a hash value is to be calculated while avoiding duplication. Because the transaction 1011 corresponds to the entire printed product, only one transaction 1011 is transmitted when one printed product is output from the image forming apparatus 101.

The original document name 1102 is information indicating a name of a printed electronic document. The information is used for enhancing reliability of success in document verification by displaying and presenting the information to the user via a UI when document verification is successful.

Heretofore, information included in the transaction 1011 in the present exemplary embodiment has been described, but information that can be included in the transaction 1011 is not limited to this. For example, created date and time and a person who has created the printed electronic document may be included as information of the same type as the original document name 1102. The transaction 1011 may also include information not used for the verification of authenticity, such as a time stamp in printing and device information, and a combining method or a calculation method used in the calculation of the printed document hash value 1101, which are not illustrated.

Figure 13B:
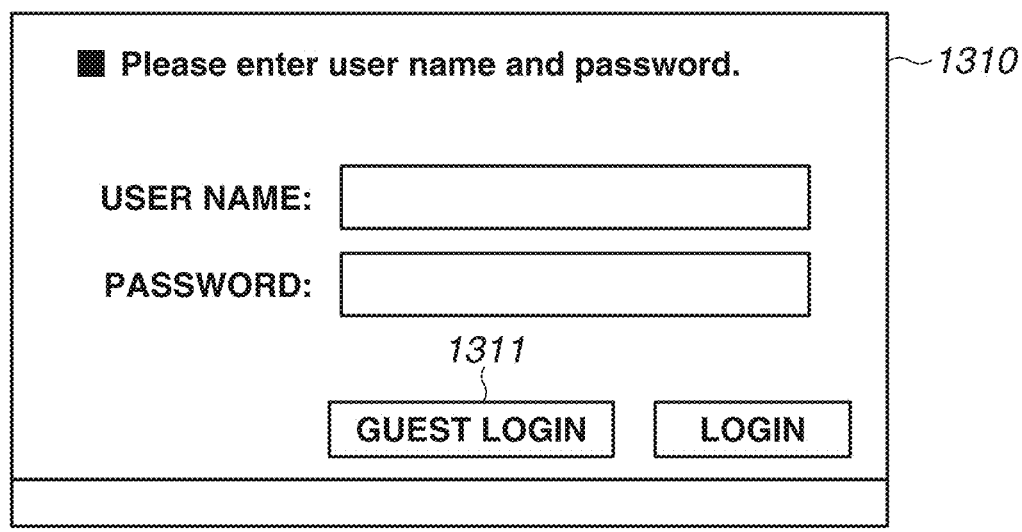

FIGS. 13A and 13B each illustrate a screen example of an authentication screen. The authentication screen 1300 illustrated in FIG. 13A is a screen for providing a function of performing user authentication for the user using the functions of the image forming apparatus 101. A user name entry field 1301 is a field for the user of the image forming apparatus 101 entering a user name. A password entry field 1302 is a field for the user of the image forming apparatus 101 entering a password. A login button 1303 is a button for executing user authentication. When the user presses this button, the user authentication processing unit 402 performs user authentication based on values entered in the user name entry field 1301 and the password entry field 1302.

An authentication screen (guest login) 1310 illustrated in FIG. 13B is a screen example of an authentication screen provided with guest login, and is a screen for providing a function of performing user authentication for the user using the functions of the image forming apparatus 101. Hereinafter, only differences from the authentication screen 1300 will be described.

A guest login button 1311 is a button for executing user authentication as a guest user. When the user presses this button, the user authentication processing unit 402 permits login without performing authentication based on a user name and a password. A user who has logged in the image forming apparatus 101 by pressing the guest login button 1311 has a user name "Guest" and a role of "Guest User". In the present exemplary embodiment, a screen to be displayed may be switched between the authentication screen 1300 and the authentication screen (guest login) 1310 by the setting of the user authentication processing unit 402, which will not be described in detail.

Figure 14A:
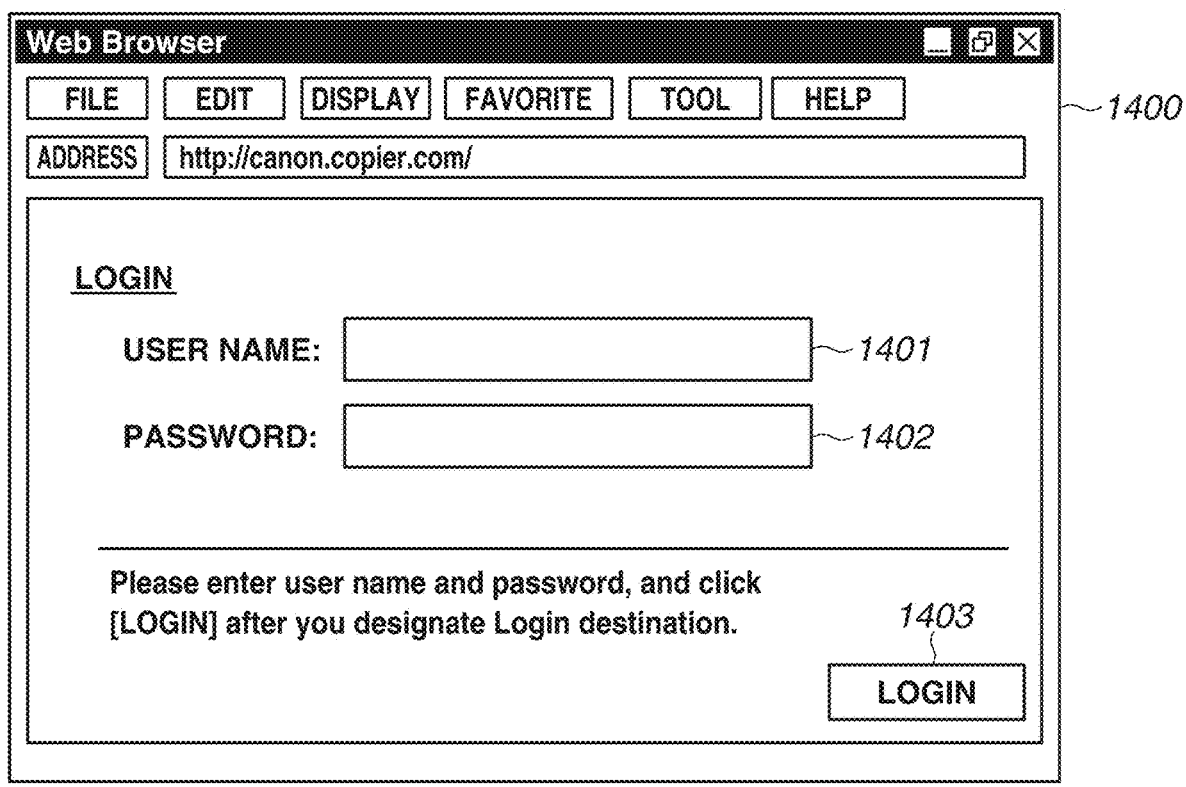
FIGS. 14A and 14B each illustrate a screen example of a remote authentication screen.
Figure 14B:
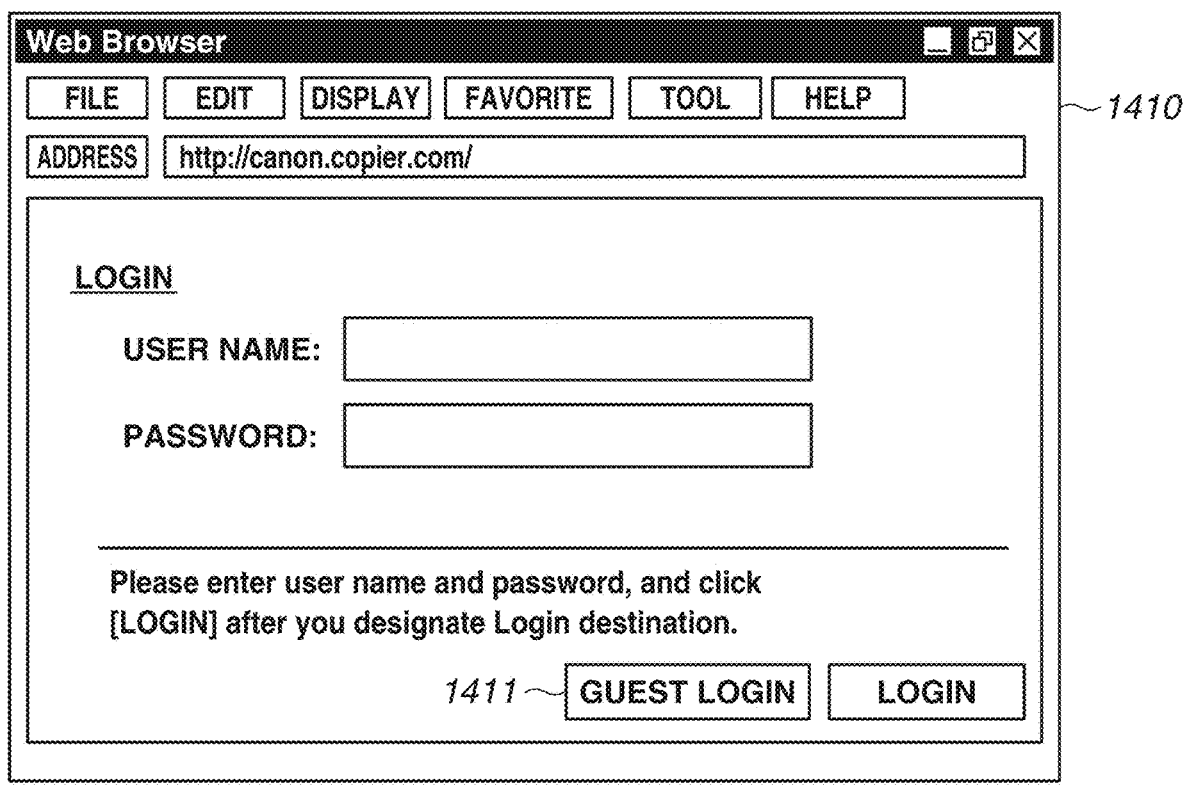

FIGS. 14A and 14B each illustrate a screen example of a remote authentication screen. A remote authentication screen 1400 illustrated in FIG. 14A is a screen for performing user authentication for the user using the functions of the image forming apparatus 101 from the web browser on the PC 102. A user name entry field 1401 is a field for the user of the image forming apparatus 101 entering a user name. A password entry field 1402 is a field for the user of the image forming apparatus 101 entering a password. A login 1403 is a button for executing user authentication. When the user presses the button, the user authentication processing unit 402 performs user authentication based on values entered in the user name entry field 1401 and the password entry field 1402.

A remote authentication screen (guest login) 1410 illustrated in FIG. 14B is a screen for providing a function of performing user authentication for the user using the functions of the image forming apparatus 101. Hereinafter, only differences from the remote authentication screen 1400 will be described. A guest login button 1411 is a button for executing user authentication as a guest user. When the user presses the button, the user authentication processing unit 402 permits login without performing authentication based on a user name and a password. A user who has logged in the image forming apparatus 101 by pressing the guest login button 1411 has a user name "Guest" and a role of "Guest User". The user has limited accessible functions in accordance with the authority in a role information table. In the present exemplary embodiment, a screen to be displayed may be switched between the remote authentication screen 1400 and the remote authentication screen (guest login) 1410 by the setting of the user authentication processing unit 402, which will not be described in detail.

FIGS. 15A and 15B each illustrate a screen example of a screen for selecting a function that is to be displayed by the local UI control unit 400 and the remote UI control unit 401. The screens for selecting a function illustrated in FIGS. 15A and 15B display a list of functions included in the image forming apparatus 101. By pressing a button displayed on the screen, the user of the image forming apparatus 101 can use each function included in the image forming apparatus 101. The function selection screen 1500 illustrated in FIG. 15A is a screen displayed on the operation unit 209 by the local UI control unit 400 immediately after the user logs in the image forming apparatus 101 via the authentication screen 1300 or the authentication screen (guest login) 1310. A function selection button 1501 is a button for using each function of the image forming apparatus 101.

A copy button is a button for displaying a screen for using a copy function. A send button is a button for displaying a screen for using a function of sending a scanned document to the PC 102. A store button is a button for displaying a screen for using a function of storing a scanned electronic document into the HDD 204. In the present exemplary embodiment, the description of a screen to be displayed after each button is pressed will be omitted. All of these screens are as discussed in the prior art.

In a case where a document print button is pressed, the printing screen 1600 is displayed. TransPrint is a function of registering all documents to be printed, into the blockchain service. In this manner, a button specialized for a specific use case or work flow may be prepared. When a TransPrint button is pressed, the printing screen 1600 is displayed in a state in which a blockchain function is enabled. When a document verification button is pressed, the verification screen 1700 is displayed.

A logout button 1502 is a button for executing logout processing that is to be displayed in a login state. When the button is pressed, logout processing is executed, and thereafter, the authentication screen 1300 or the authentication screen (guest login) 1310 is displayed.

The function selection screen 1510 illustrated in FIG. 15B is an example of a screen displayed on the web browser on the PC 102 by the remote UI control unit 401 immediately after the user logs in the image forming apparatus 101 via the remote authentication screen 1400 or the remote authentication screen (guest login) 1410. A function selection button 1511 is a button for using each function. Similarly to the function selection screen 1500, the description of a screen to be displayed after a store button is pressed will be omitted. In a case where a document print button is pressed, the printing screen 1610 is displayed. When a TransPrint button is pressed, the printing screen 1610 is displayed in a state in which a blockchain function is enabled. When a document verification button is pressed, the verification screen 1710 is displayed. The function selection is not limited to this configuration. For example, the application A 404 may be displayed on the function selection screen 1500, and a function, such as printing or verification, may be selected after the application A 404 is selected.

FIGS. 16A and 16B each illustrate a screen example of a document printing screen to be displayed by the application A 404. The printing screen 1600 illustrated in FIG. 16A is a screen for providing a function of printing a document managed by the document management apparatus 103. A document selection list 1601 is a list for selecting a document to be stored or printed. The application A 404 displays documents managed by the document management apparatus 103, in the document selection list 1601. A print button 1602 is a button for executing printing of a document selected from the document selection list 1601. A BC registration selection button 1603 is a button for prompting the user to select whether to register a document to be printed into a blockchain, and embed inquiry information into the document. The BC registration selection button 1603 may not be displayed depending on a login user or a document to be printed. In this case, processing is performed using a method of forcibly registering printing information into the blockchain service or a method of not registering printing information. The printing screen 1610 illustrated in FIG. 16B is a screen for providing a function of printing a document managed by the document management apparatus 103, and is an example of a screen to be displayed on the web browser on the PC 102. Each button is similar to that in FIG. 16A, and thus the description will be omitted.

FIGS. 17A and 17B each illustrate a screen example of a screen for verifying a document to be displayed by the application A 404. The verification screen 1700 illustrated in FIG. 17A is a screen for providing a function of verifying, using the blockchain apparatus 111, that a scanned document or a document stored in the image forming apparatus 101 is a rightful document.

A document selection setting 1701 is a setting for selecting a verification target document from a scanned paper document or a document stored in the image forming apparatus 101. A document selection list 1702 is a list for selecting a verification target document, and is a list of documents stored in the HDD 204. At this time, documents managed by the PC 102 or the document management apparatus 103 may be displayed similarly to the screens illustrated in FIGS. 16A and 16B, or stored documents and managed documents may be both displayed. In the present exemplary embodiment, the display of such documents is omitted. The same applies to the following description of documents stored in the HDD 204. A verification button 1703 is a button for executing scanning of a document when "SCAN" is selected by the document selection setting 1701, and thereafter, executing verification of the document using the blockchain apparatus 111.

In a case where "STORED DOCUMENT" is selected by the document selection setting 1701, verification of a document selected from the document selection list 1702 is performed upon the press of the verification button 1703. The verification screen 1710 illustrated in FIG. 17B is a screen for providing a function of verifying, using the blockchain apparatus 111, that a document stored in the HDD 204 is a rightful document, and is an example of a screen to be displayed on the web browser on the PC 102.

FIGS. 19A and 19B each illustrate screen examples of a screen of a document verification result to be displayed by the application A 404. A verification result screen 1900 illustrated in FIG. 19A is a screen for notifying the user that a document verification result obtained using the blockchain apparatus 111 indicates success. The number of read pages 1901 indicates the number of pages checked in document verification. On the verification result screen 1900 illustrated in FIG. 19A, the number of read pages 1901 is five. A verification result 1902 is a result of document verification of this time. On the verification result screen 1900 illustrated in FIG. 19A, the verification result 1902 indicates that verification is successful. The success means that the authenticity of a verified document has been confirmed. Specifically, the success refers to a case where a transaction corresponding to inquiry information identified based on embedded information of a document has been found in the blockchain service.

A document name 1903 of a source file is a file name of an electronic document serving as a source file of a document verified this time, and indicates an acquisition result of the original document name 1102 included in the transaction 1011 corresponding to inquiry information. FIG. 19A indicates that "ORIGINAL DOCUMENT.pdf" is a file name of an electronic document serving as a source file. A continue to verify button 1904 is a button for transitioning to a verification screen for executing verification of the next document. An end button 1905 is a button for ending verification processing.

A verification result screen 1910 illustrated in FIG. 19A is a screen for notifying the user that a document verification result obtained using the blockchain apparatus 111 is a failure. The number of read pages 1901, the continue to verify button 1904, and the end button 1905 are similar to those on the verification result screen 1900, and thus the description will be omitted. On the verification result screen 1910 illustrated in FIG. 19A, the verification result 1902 indicates that the verification has failed. The failure means that authenticity of a verified document has not been confirmed. Specifically, the failure refers to a case where embedded information of the document has not been correct, or a case where a transaction corresponding to inquiry information has not been found in the blockchain service. The verification result screen 1910 illustrated in FIG. 19A indicates that the document name 1903 of a source file has failed to be acquired. A verification result screen 1950 illustrated in FIG. 19B is a screen for notifying the user that a document verification result obtained using the blockchain apparatus 111 is successful. The verification result screen 1950 is also an example of a screen to be displayed on the web browser on the PC 102. A verification result screen 1960 illustrated in FIG. 19B is a screen for notifying the user that a document verification result obtained using the blockchain apparatus 111 is a failure. The verification result screen 1960 is also an example of a screen to be displayed on the web browser on the PC 102.

Figure 21:
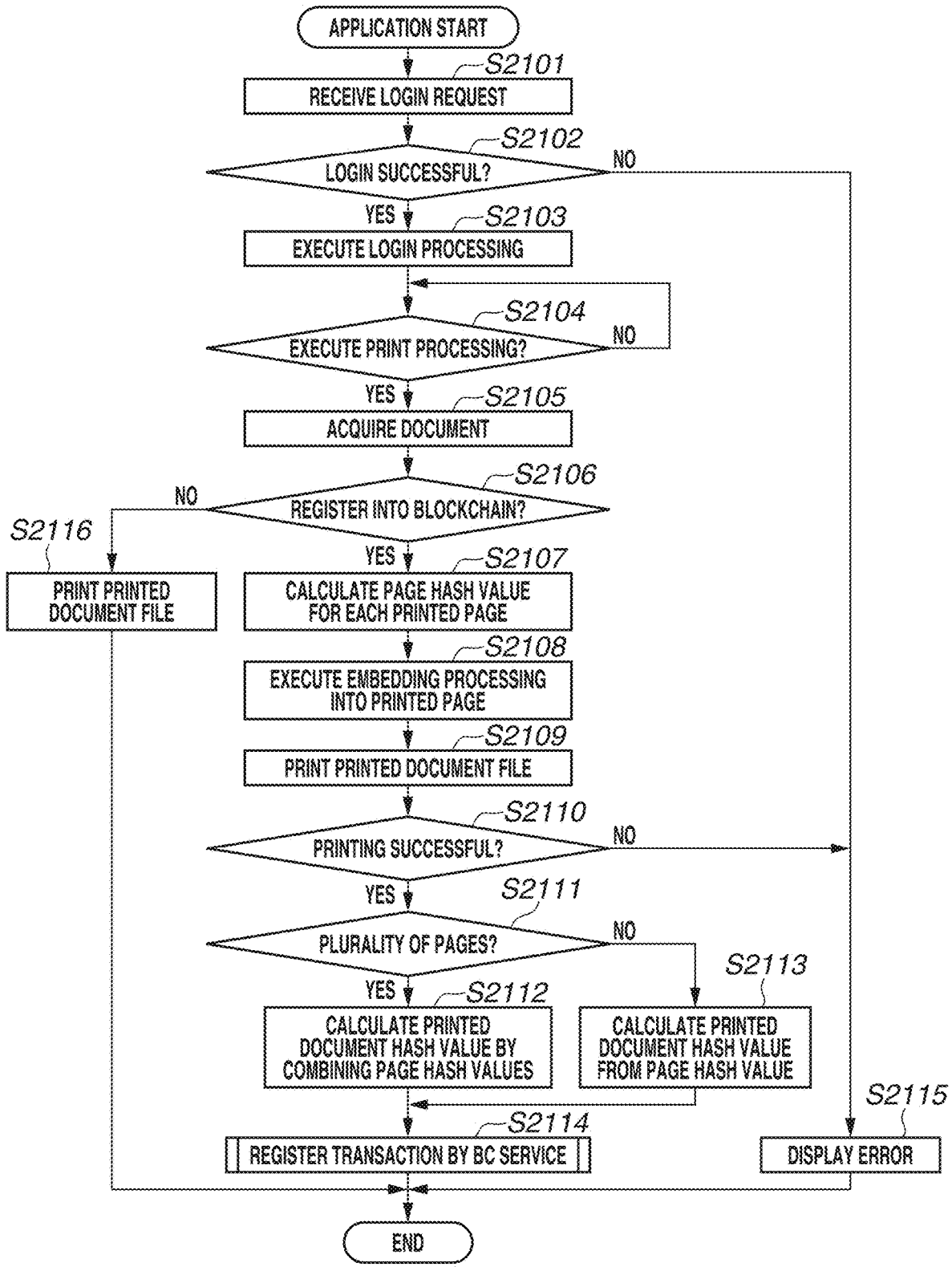
FIG. 21 is a flowchart of printing processing of a document by an image forming apparatus.

FIG. 21 is a flowchart illustrating processing of printing an electronic document stored in the document management apparatus 103, from the image forming apparatus 101. The description will be given of a case where the user uses the image forming apparatus 101 via the control unit 200, but the user may use the image forming apparatus 101 via the web browser on the PC 102.

The processing is started by the login button 1303 being pressed on the authentication screen 1300, and the user authentication processing unit 402 is executed in the CPU 201. When the processing of the flowchart is started, a user name and a password entered by the user of the image forming apparatus 101 on the authentication screen 1300 are provided to the user authentication processing unit 402. In S2101, the user authentication processing unit 402 receives a user name and a password as a login request. In S2102, the user authentication processing unit 402 checks whether the received user name and password match a user name and a password in the user information table indicated in Table 1. If the user name and the password match a user name and a password in the user information table (YES in S2102), it is determined that user authentication has succeeded, and the processing proceeds to S2103. If the user name and the password do not match a user name and a password in the user information table (NO in S2102), it is determined that user authentication has failed, and the processing proceeds to S2115.

In S2103, as login processing, the user authentication processing unit 402 stores the user name received in S2101, in the RAM 203 as a name of a currently logged in user, and hands the processing over to the local UI control unit 400. The local UI control unit 400 takes over the processing and displays the function selection screen 1500 on the operation unit 209. In the flowchart, a print button is subsequently pressed by the user on the function selection screen 1500. The subsequent processing is executed by the application A 404 in the CPU 201. The application A 404 taking over the processing displays the printing screen 1600 on the operation unit 209.

In S2104, the application A 404 displays the printing screen 1600 illustrated in FIG. 16A, on the operation unit 209 via the operation unit I/F 205, and determines whether the print button 1602 has been pressed. If the print button 1602 is pressed (YES in S2104), the processing proceeds to S2105. In S2105, the application A 404 acquires an electronic document selected from the document selection list 1601 of the printing screen 1600, from the document management apparatus 103. The application A 404 temporarily stores document information of the acquired electronic document in the RAM 203, and stores a document file in the HDD 204.

In S2106, the application A 404 determines whether "REGISTER" is selected in the BC registration selection button 1603. If "REGISTER" is selected (YES in S2106), the processing proceeds to S2107. If "REGISTER" is not selected (NO in S2106), the processing proceeds to S2116. In S2116, the application A 404 performs print processing of document data stored in the HDD 204, from the printer 210 via the printer I/F 206 of the image forming apparatus 101.

In S2107, the application A 404 generates a hash value for each page to be printed based on the document data stored in the HDD 204. A hash value generated in the operation is regarded as a page hash value. A generation method of a page hash value is not limited as long as the page hash value is unique to each page of a printed product, and a printed document hash value calculated from the page hash values is unique when being registered into the blockchain service. For example, information regarding each page to be printed or a time stamp, and credential information of an application or a device that performs the processing may be generated in combination. Since a page hash value is generated for each page, ten different page hash values are generated if a printed product includes ten pages. In the present exemplary embodiment, the image forming apparatus 101 generates a page hash value, but the configuration is not limited to this configuration. For example, a generation request may be issued to another information processing apparatus, such as the blockchain apparatus 111 and the document management apparatus 103, and a generated value may be acquired.

In S2108, the application A 404 performs processing of embedding a page hash value generated in S2107 for each page to be printed, into print data of a corresponding page.

Hereinafter, information embedded in S2108 will be referred to as embedded information. The embedded information is information to be converted into an embedded image (e.g., barcode) readable when being scanned and embedded. The embedded information mainly includes inquiry information for the blockchain service. An embedded image generated by conversion may be visible information visible to the user or invisible information invisible to the user, and may be any image as long as the embedded image can be embedded into paper. In a case where the user is desired to be expressly notified that the page has already been registered into the blockchain, the embedded image is desirably embedded as visible information. As an example, a two-dimensional barcode can be used. Alternatively, the embedded image may be embedded as invisible information if the appearance of a document is not desired to be deteriorated. As an example, the inquiry information can be embedded into the document as invisible information by printing a pattern invisible to the user using extremely small toner or ink dots. Aside from these embedded images, any form of embedded image may be generated as long as information regarding a document is recorded as embedded information. The image forming apparatus 101 can acquire the embedded information by decoding (i.e., decrypting) the embedded image.

In S2109, the application A 404 performs printing processing of the printed document file having been subjected to embedding processing, from the printer 210 via the printer I/F 206 of the image forming apparatus 101. In S2110, the application A 404 then determines whether printing processing has normally ended. If printing processing has normally ended (YES in S2110), the processing proceeds to S2111. If printing processing has not normally ended (NO in S2110), the processing proceeds to S2115. In a case where a printed product includes a plurality of pages, the processing performed in S2107 to S2109 may be concurrently performed. For example, generation processing of a page hash value for the second page (S2107) may be performed in parallel with embedding processing for the first page (S2108). In S2111, the application A 404 determines whether a printed product includes a plurality of pages. If the printed product includes a plurality of pages (YES in S2111), the processing proceeds to S2112. If the printed product does not include a plurality of pages (includes a single page) (NO in S2111), the processing proceeds to S2113.

In S2112, the application A 404 calculates a printed document hash value by combining a plurality of page hash values generated this time. As a specific example of a calculation method, the application A 404 sorts the plurality of page hash values generated this time, in ascending order, combines the page hash values as a character string, and then calculates a hash value from the character string. As described above in the description of the printed document hash value 1101 illustrated in FIG. 11, a combining method and a calculation method are not limited as long as the same hash value is calculated from the same page hash values. In S2113, the application A 404 calculates a printed document hash value from a single page hash value generated this time. The calculation method in this operation is similar to that in S2112. Thereafter, the processing proceeds to S2114.

While the application A 404 performs the processing up to S2113, the blockchain application 406 performs processing in S2114. In S2114, the blockchain application 406 registers information regarding printing processing in the blockchain apparatus 111. A transaction to be subjected to registration processing in this operation is one of the transactions 1011 corresponding to the entire printed product illustrated in FIG. 11. The registration processing will be described below with reference to FIG. 24. The printed document hash value 1101 included in the transaction 1011 as information is the printed document hash value calculated in S2112. The original document name 1102 is a file name included in document information regarding the electronic document that has been acquired and stored in the RAM 203 in S2105. In S2115, an error display is performed for indicating that printing cannot be permitted in the processing of this flowchart. The error display is performed is displaying an error dialog (not illustrated) on a screen.

In this manner, a page hash value for uniquely identifying each printed page is generated, and the page hash values are printed with being embedded into a printed document. If printing has normally succeeded, a printed document hash value calculated from the page hash values can then be registered into the blockchain service. Aside from the case of printing a document with embedded hash values described here, a case of storing a document with embedded hash values in the HDD 204 or the HDD 305 as an electronic document, and a case of executing the printing and the storing simultaneously are considered, which will not be described in the present exemplary embodiment.

Figure 22A:
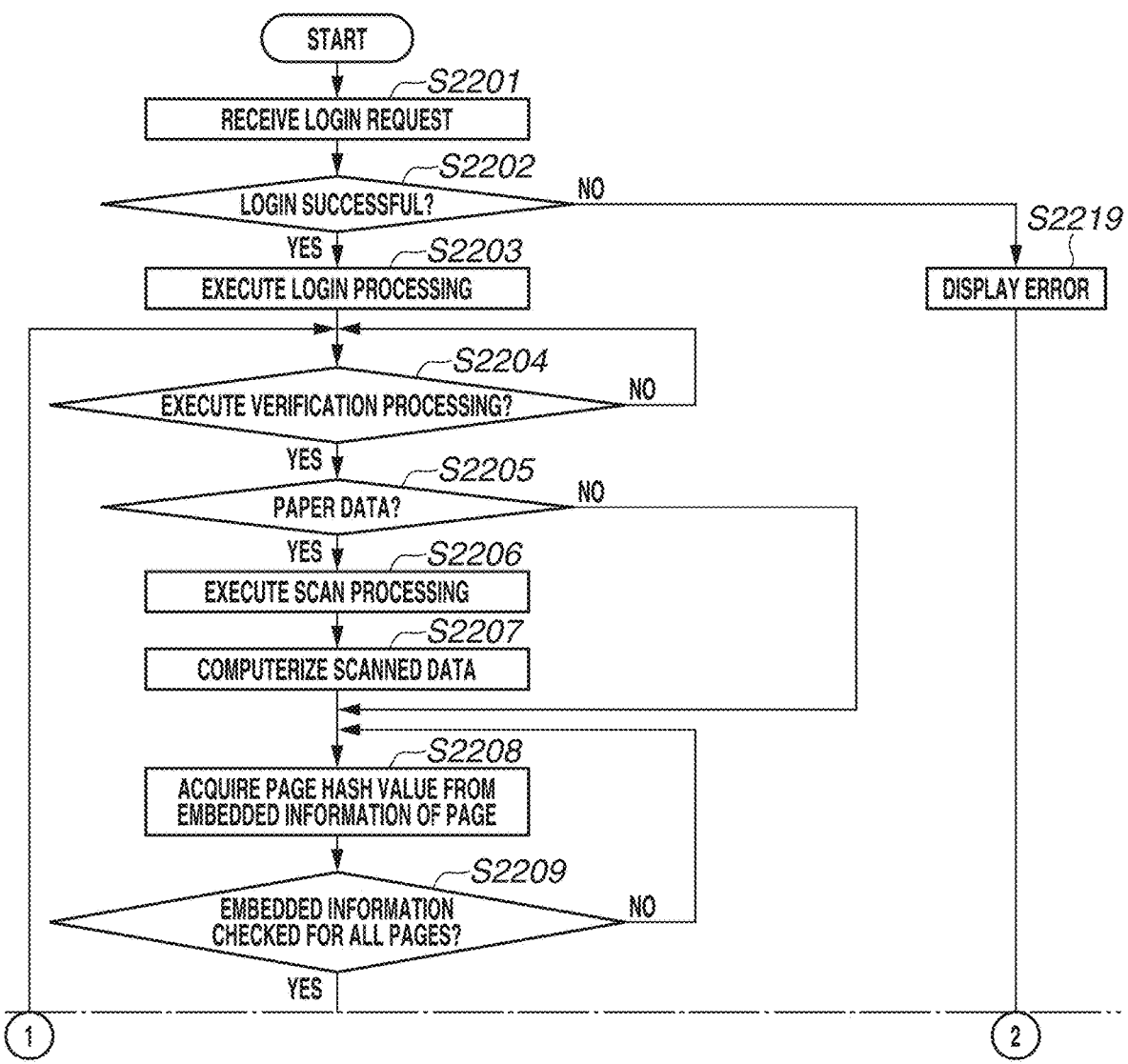
FIGS. 22A and 22B illustrate a flowchart of verifying processing of a document according to the first exemplary embodiment.
Figure 22B:
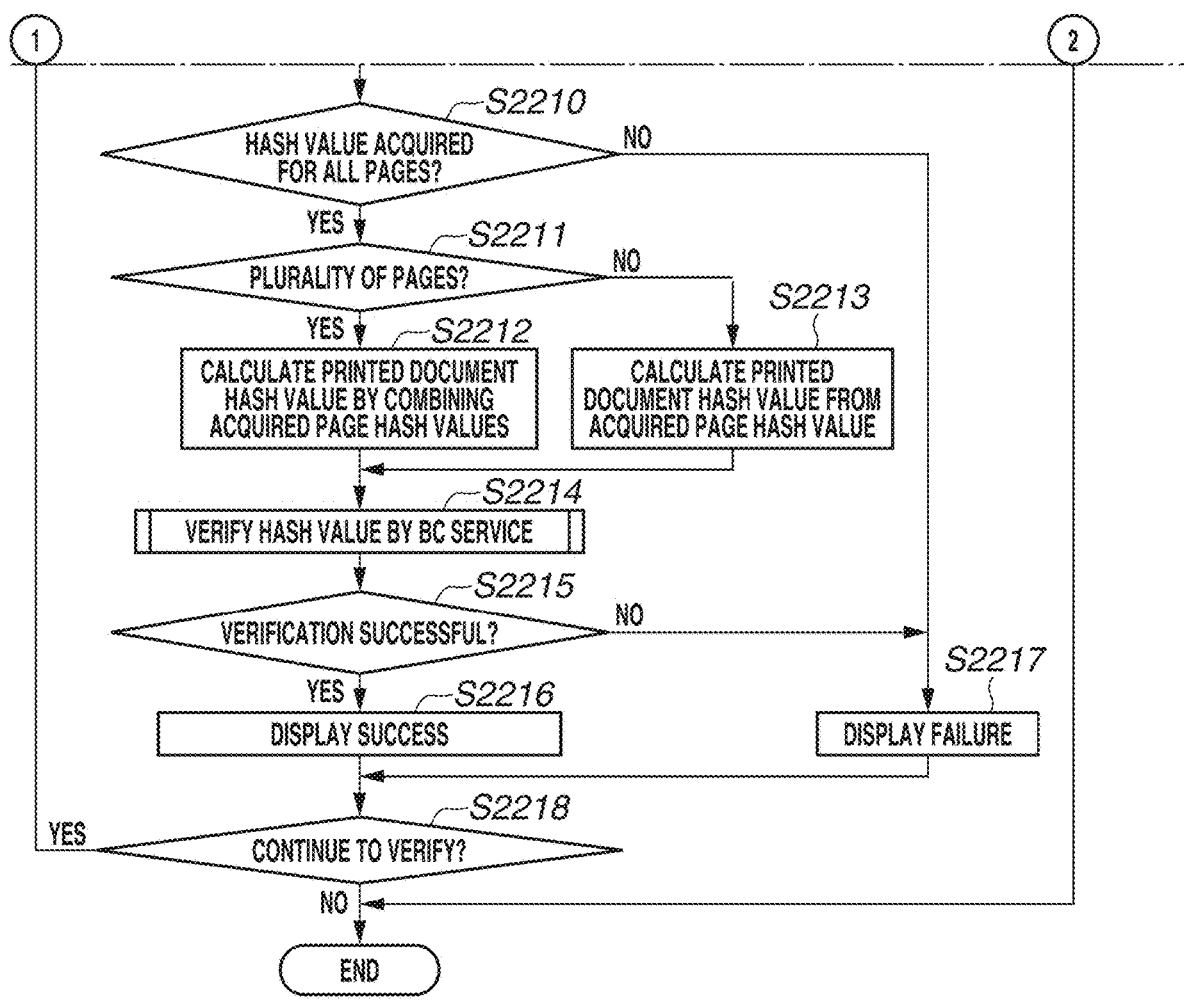

FIGS. 22A and 22B illustrate a flowchart of verifying processing of a document file designated by the user or a printed paper document, from the image forming apparatus 101. The processing in this flowchart is started by the login button 1303 on the authentication screen 1300 or the guest login button 1311 on the authentication screen 1310, of the image forming apparatus 101 that are illustrated in FIGS. 13A and 13B, being pressed, and the user authentication processing unit 402 is initially executed in the CPU 201. When the processing of this flowchart is started, a user name and a password entered by the user of the image forming apparatus 101 on the authentication screen 1300 are provided to the user authentication processing unit 402.

In S2201, the user authentication processing unit 402 receives a user name and a password as a login request. In S2202, the user authentication processing unit 402 checks whether the received user name and password match a user name and a password stored in the user information table indicated in Table 1. If the user name and the password match a user name and a password in the user information table (YES in S2202), it is determined that user authentication has succeeded, and the processing proceeds to S2203. If the user name and the password do not match a user name and a password in the user information table (NO in S2202), it is determined that user authentication has failed, and the processing proceeds to S2219.

In S2203, as login processing, the user authentication processing unit 402 stores the user name received in S2201 in the RAM 203 as a name of a currently logged in user, and transfers the processing to the local UI control unit 400. The local UI control unit 400 taking over the processing displays the function selection screen 1500 on the operation unit 209. In this flowchart, a document verification button is subsequently pressed by the user on the function selection screen 1500. The subsequent processing is executed by the application A 404 in the CPU 201. The application A 404 taking over the processing displays the verification screen 1700 on the operation unit 209.

In S2204, the application A 404 displays the verification screen 1700 illustrated in FIG. 17A on the operation unit 209 via the operation unit OF 205, and determines whether the verification button 1703 has been pressed. If the verification button 1703 has been pressed (YES in S2204), the processing proceeds to S2205. In S2205, the application A 404 determines whether a target document selected by the user in the document selection setting 1701 is paper data. If the selected target document is paper data (YES in S2205), the processing proceeds to S2206. If the selected target document is electronic data (NO in S2205), the processing proceeds to S2208.

In S2206, the application A 404 scans a paper document set on the image forming apparatus 101.

In the scanning, the paper document is read by the scanner 211 via the scanner OF 207, and image data is generated. In S2207, the application A 404 computerizes data converted into an image by the scanner 211, and temporarily stores the data in the HDD 204 as electronic data. The temporary data is deleted when the processing of the flowchart ends. Hereinafter, electronic data stored in this operation is regarded as input electronic data.

In S2208, the application A 404 extracts embedded information of each page that has been embedded in printing, from electronic data selected by the user in the document selection setting 1701, or electronic data obtained by computerizing paper data selected by the user, in S2207, and acquires a page hash value. In S2209, the application A 404 determines whether there is any page of which embedded information has not been checked in S2208. If there is any page of which embedded information has not been checked (NO in S2209), the processing returns to S2208. If embedded information has been checked for all pages (YES in S2209), the processing proceeds to S2210.

In S2210, the application A 404 determines whether page hash values have been acquired for all pages in S2208. If the acquisition has succeeded (YES in S2210), the processing proceeds to S2211. If there is any page from which the extraction of embedded information has failed, or in a case where a page hash value has failed to be acquired from extracted embedded information (NO in S2210), the processing proceeds to S2217.

In S2211, the application A 404 determines whether a plurality of pages has been checked this time. In a case where a plurality of pages has been checked (YES in S2211), the processing proceeds to S2212. In a case where a plurality of pages has not been checked (NO in S2211), the processing proceeds to S2213. In S2212, the application A 404 calculates a printed document hash value by combining a plurality of page hash values acquired in S2208. As state above in the description of the printed document hash value 1101 in FIG. 11, a combining method and a calculation method used in this operation needs to be the same methods as those used in printing. In S2213, the application A 404 calculates a printed document hash value from a single page hash value acquired in S2208. The calculation method is similar to that performed in S2212. Thereafter, the processing proceeds to S2214.

In S2214, the blockchain application 406 performs verification processing using transaction information recorded in the blockchain apparatus 111. The verification processing will be described below with reference to FIG. 24. At this time, a processing type indicating verification, the printed document hash value acquired in S2212 or S2213, and the credential information A 408 are provided. If a processing result is received as a response to a request, the processing proceeds to S2215. In S2215, the application A 404 determines a verification result. If the verification has succeeded (YES in S2215), the processing proceeds to S2216. If the verification has failed (NO in S2215), the processing proceeds to S2217.

In S2216, the application A 404 displays the verification result screen 1900 displaying a message indicating that the verification has succeeded, for example. At this time, the number of read pages 1901 is the number of pages checked in S2208. As the document name 1903 of a source file, the original document name 1102 included in the processing result received in S2214 as a response is displayed. In S2217, the application A 404 displays the verification result screen 1910 displaying a message indicating that the verification has failed, for example. Since information to be displayed is similar to that displayed in S2216, the description will be omitted. However, if it is determined in S2210 that there is any page for which acquisition has failed, information (not illustrated) regarding the page may be displayed. In S2218, the application A 404 determines whether the user has issued an instruction to continue to verify, on the verification result screen 1900 displayed in S2216, or on the verification result screen 1910 displayed in S2217. If the user has issued an instruction to continue to verify (YES in S2218), the processing return to S2204. If the user has issued an instruction to end (NO in S2218), the processing of the flowchart ends. Even if the user has issued an instruction to continue to verify, the processing of the flowchart may end in view of the security aspect, and the authentication screen 1300 may be displayed immediately after the end, if a long time has elapsed from the last login processing, for example.

In this manner, verification of authenticity can be performed even for a printed product including a plurality of pages, by performing the processing in S2208 to S2215. In a case where a printed product in printing and a printed product in verification are different, a printed document hash value calculated in S2212 or S2213 becomes a value different from that in printing, and thereby verification fails in S2214. Thus, it is possible to detect, for example, a case where different printed products are mixed, and a case where a printed document lacks any page as compared with a printed document in printing. In contrast, in a case where a printed document hash value calculated in S2212 or S2213 becomes the same value as that in printing, it can be determined that the printed document is in the same state as that in printing, and authenticity is guaranteed.

Figure 24:
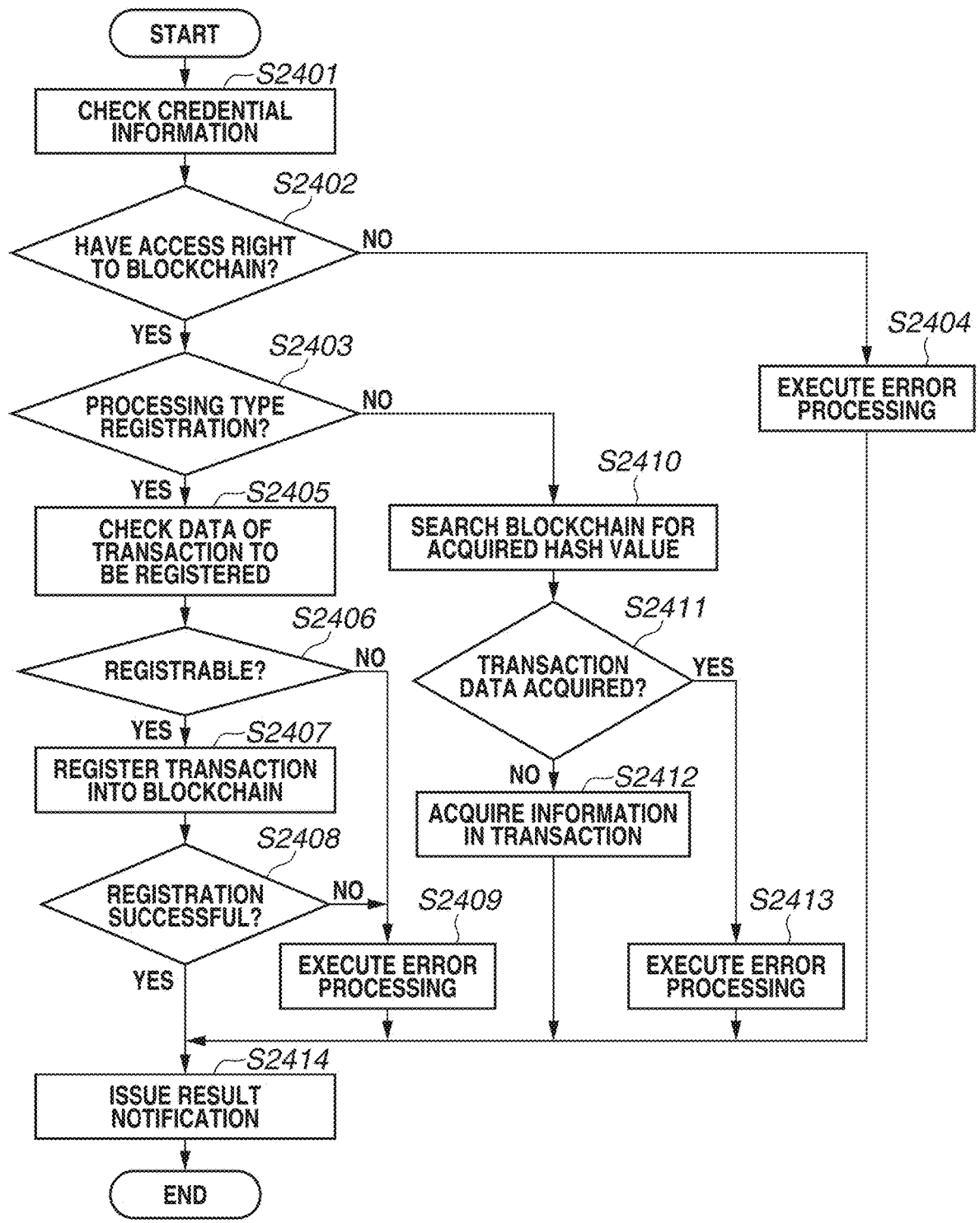
FIG. 24 is a flowchart illustrating transaction processing for a blockchain apparatus.

FIG. 24 is a flowchart illustrating transaction processing for the blockchain apparatus 111 that is performed by the blockchain application 406 of the image forming apparatus 101. The processing of the flowchart is started and executed by the blockchain application 406 during the processing of the application A 404 illustrated in FIGS. 21, 22A and 22B.

When the processing of the flowchart is started, a processing type and information necessary for each processing type are provided to the blockchain apparatus 111 from the application A 404. As the information necessary for each processing type, the transaction 1011 is provided in transaction registration, and a hash value to be verified is provided in verification.

In S2401, the blockchain application 406 provides the credential information C 407 and the credential information A 408 to the blockchain apparatus 111, and checks that the credential information C 407 and the credential information A 408 are correct credential information. Credential information acquired from the credential information management unit 410 when the blockchain application 406 is activated is used as the credential information C 407, and credential information acquired from the application A 404 is used as the credential information A 408.

In S2402, the blockchain application 406 determines whether credential information checked in S2401 is correct credential information. In a case where credential information is a digital certificate, verification of the digital certificate is performed and, if the verification has succeeded, it is determined that the credential information is correct credential information. In a case where credential information is a predefined data value and if values match, it is determined that the credential information is correct credential information. In a case where the credential information is correct credential information (YES in S2402), the blockchain apparatus 111 can be accessed, and thus the processing proceeds to S2403. In a case where the credential information is not correct credential information (NO in S2402), the processing proceeds to S2404. In S2403, the blockchain application 406 determines whether the received processing type is transaction registration. If the processing type is transaction registration (YES in S2403), the processing proceeds to S2405. If the processing type is verification (NO in S2403), the processing proceeds to S2410.

In S2404, the blockchain application 406 generates error information indicating that an access right to the blockchain apparatus 111 is not satisfied in the processing of the flowchart. In S2405, the blockchain application 406 checks whether transaction information received when the processing is started exists. The blockchain application 406 checks that a hash value serving as a key of a transaction is not registered in the blockchain apparatus 111, by searching the blockchain apparatus 111. If information is incomplete or a hash value is identical to a registered hash value, transaction information is incorrect. In S2406, the blockchain application 406 determines the check result. If transaction information is correct (YES in S2406), the processing proceeds to S2407. In a case where transaction information is incorrect (NO in S2406), the processing proceeds to error processing in S2409.

In S2407, the blockchain application 406 issues a registration request of the checked transaction 1011 to the blockchain apparatus 111. In the operation, the blockchain application 406 receives success/failure from the blockchain apparatus 111 as a result of registration processing. In S2408, the blockchain application 406 determines the processing result from the blockchain apparatus 111. If the processing result indicates failure (NO in S2408), the processing proceeds to error processing in S2409. If the processing result indicates success (YES in S2408), the processing proceeds to result notification in S2414. In S2409, the blockchain application 406 generates error information indicating that transaction registration cannot be performed in the processing of the flowchart.

In S2410, the blockchain application 406 searches the blockchain apparatus 111 for a transaction holding, as a key, a hash value received when the processing is started, and acquires the transaction. In S2411, the blockchain application 406 determines a search result. If transaction data has failed to be acquired (NO in S2411), the hash value is determined to be a correct hash value, and the processing proceeds to S2412. If transaction data has been acquired (YES in S2411), the hash value is determined to be a redundant incorrect hash value, and the processing proceeds to error processing in S2413. In S2412, the blockchain application 406 acquires information in the acquired transaction, and the processing proceeds to S2414.

In S2414, the blockchain application 406 notifies, as information acquired when processing of each processing type has succeeded, processing serving as an invoker, of a registration completion status in the case of transaction registration, or a verification success status and acquired transaction information in the case of verification. In a case where error processing has been performed, the blockchain application 406 notifies processing serving as an invoker, of error information.

Figure 6:
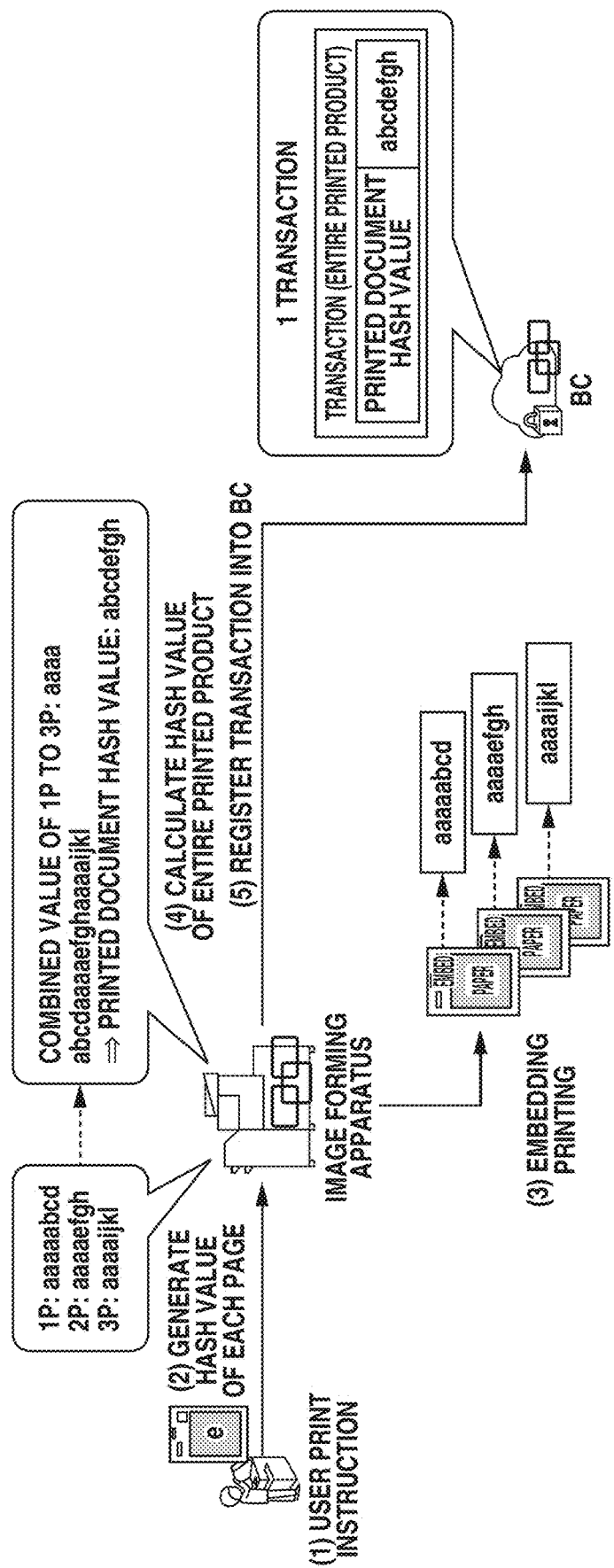
FIG. 6 is a diagram illustrating an overview according to a first exemplary embodiment.

The overview of the present exemplary embodiment will be described with reference to FIG. 6. FIG. 6 is a diagram briefly illustrating the data configuration of the transaction 1011 illustrated in FIG. 11, and the flowchart in printing illustrated in FIG. 21. FIG. 6 illustrates, in the present exemplary embodiment, that a hash value unique to each page is generated, printing is performed while embedding the hash values, the printed document hash value 1101 is calculated by combining a set of the page hash values, and one transaction corresponding to the entire printed product is registered.

As described above, the image forming apparatus 101 can properly use the blockchain service, and the verification of authenticity can be performed for a printed product having a plurality of pages, according to the present exemplary embodiment.

In the first exemplary embodiment, the verification of authenticity is performed for a printed product having a plurality of pages by including the printed document hash value 1101 calculated by combining page hash values, as information regarding a transaction. Nevertheless, in view of a utility form, a case where authenticity of a printed product having a plurality of pages is desired to be verified for each page instead of verifying the entire printed product having all pages can be considered. For example, the case corresponds to a case where a printing operator collectively prints a plurality of pages as one printed product, and then allocates each page to each requiring person. In this case, a verification executor to which each page is allocated needs to have a function of verifying authenticity of the corresponding page even if the entire printed product is incomplete.

In a second exemplary embodiment, the description will be given of a method of verifying authenticity for a unit of the entire printed product having a plurality of pages, and for a unit of each single page, by including a page hash value in the transaction 1011 as information. Hereinafter, the former verification will be referred to as entire document verification, and the latter verification will be referred to as page verification. In addition, the scanner 211 typically includes both a document reading function using an automatic document feeder (ADF) and a document reading function using a platen. In the former case, all documents desired to be read are collectively read. In the latter case, a small number of documents are often read page by page. In the present exemplary embodiment, a difference between these cases is considered in verification.

Figure 12A:
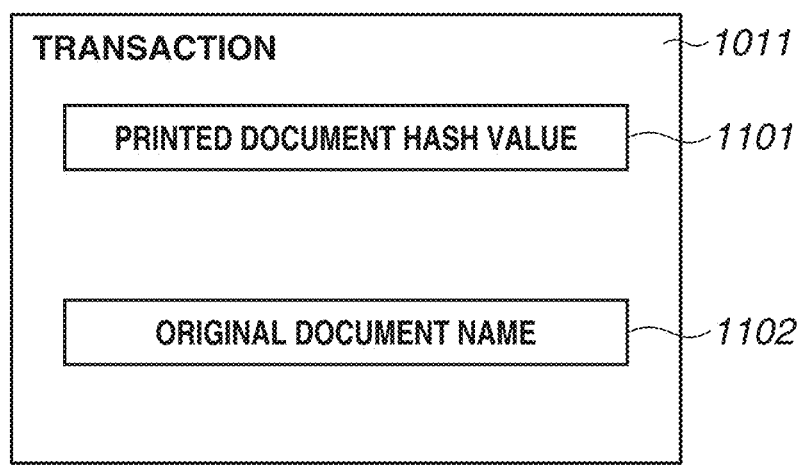
FIGS. 12A and 12B are diagrams that each illustrate a data structure of a transaction according to the second exemplary embodiment.
Figure 12B:
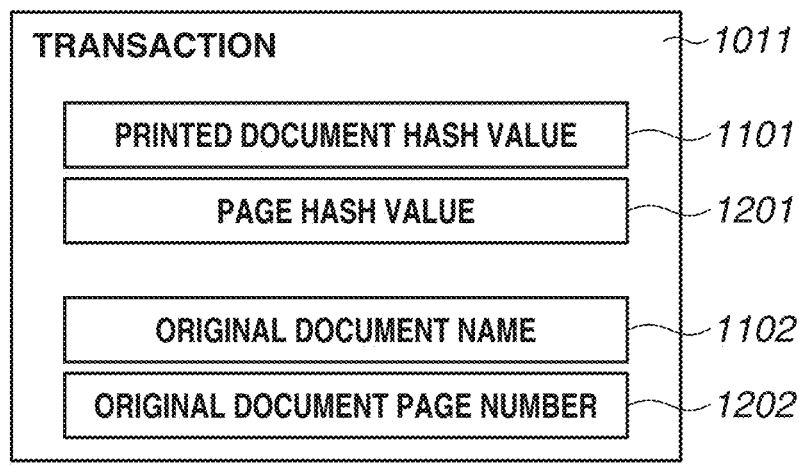

FIGS. 12A and 12B each illustrate a data structure of the transaction 1011 according to the present exemplary embodiment. In the present exemplary embodiment, major two types of transactions are registered. FIG. 12A illustrates a transaction corresponding to the entire printed product. The transaction illustrated in FIG. 12A is similar to that illustrated in FIG. 11, and thus the description will be omitted. FIG. 12B illustrates the transaction 1011 corresponding to each page of a printed product. The transaction 1011 includes, as information, a page hash value 1201 and an original document page number 1202 in addition to the printed document hash value 1101 and the original document name 1102. The page hash value 1201 is a hash value generated uniquely to each page, and is used also for calculating the printed document hash value 1101 as described in the first exemplary embodiment. In transaction 1011, the page hash value 1201 serves as key information to be identified on a blockchain. Thus, a hash value is to be generated while avoiding duplication.

The original document page number 1202 indicates the page number of this page in an electronic document serving as a source file. Similarly to the original document name 1102, this information is used for enhancing reliability of success in page verification, by displaying and presenting the information to the user via a UI when page verification has succeeded. Similarly to the first exemplary embodiment, information that may be included in the transaction 1011 is not limited to this.

In the present exemplary embodiment, these two types of transactions are registered for each printed product having a plurality of pages. One transaction corresponding to the entire printed product that is illustrated in FIG. 12A is registered, and the transaction corresponding to each page of the printed product that is illustrated in FIG. 12B is registered by the number of pages.

In contrast, a method of executing exception processing in a case where a printed product only includes one page, and registering only a transaction corresponding to the entire printed product can also be considered. In the present exemplary embodiment, however, exception processing executed depending on such number of pages is not considered.

Figure 18A:
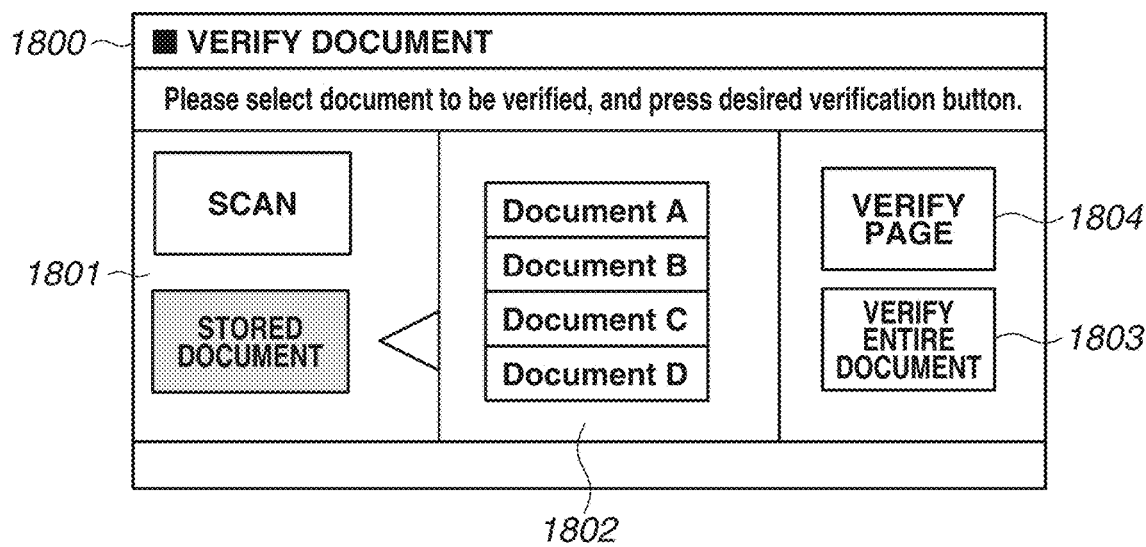
FIGS. 18A and 18B each illustrate a screen example of a document verification screen of the application A according to the second exemplary embodiment.
Figure 18B:
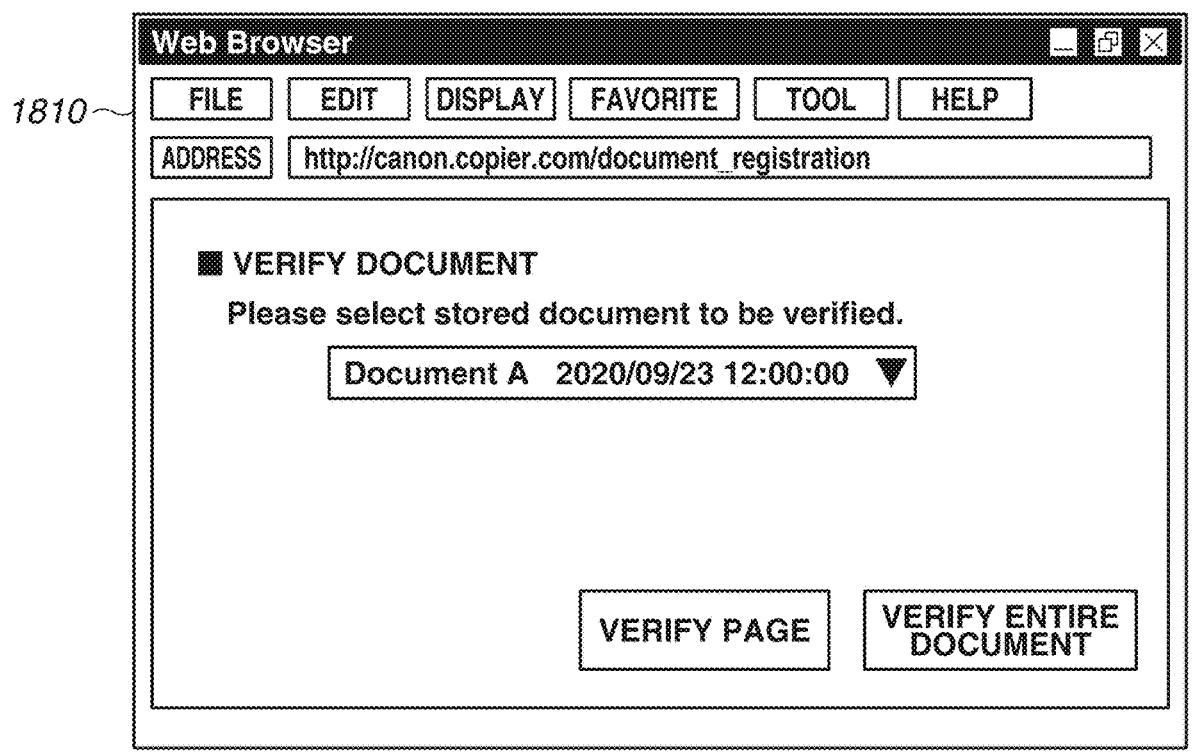

FIGS. 18A and 18B each illustrate a screen example of a screen for verifying a document that is to be displayed by the application A 404 according to the present exemplary embodiment. A verification screen 1800 illustrated in FIG. 18A is a screen for providing a function of verifying, using the blockchain apparatus 111, that a scanned document or a document stored in the image forming apparatus 101 is a correct document. A document selection setting 1801 and a document selection list 1802 are respectively similar to the document selection setting 1701 and the document selection list 1702 in FIG. 17A, and thus the description will be omitted. An entire document verification button 1803 and a page verification button 1804 are buttons obtained by dividing the verification button 1703 into two types, and are buttons for the user designating a desired verification unit. A verification screen 1810 illustrated in FIG. 18B is a screen for providing a function of verifying, using the blockchain apparatus 111, that a document stored in the HDD 204 is a correct document, and illustrates an example of a screen to be displayed on the web browser on the PC 102.

FIGS. 20A1, 20A2, 20B1 and 20B2 each illustrate screen examples of a document verification result that is to be displayed by the application A 404 according to the present exemplary embodiment. A verification result screen 2000 illustrated in FIG. 20A is a screen for notifying the user that a result of entire document verification that is obtained by using the blockchain apparatus 111 indicates success.

Since the number of read pages 2001, a verification result 2002, a document name 2003 of a source file, a continue to verify button 2004, and an end button 2005 are respectively similar to the number of pages 1901, the verification result 1902, the document name 1903 of a source file, the continue to verify button 1904, and the end button 1905 illustrated in FIG. 19A, the description will be omitted. A warning 2006 indicates a reason or various cautions for a verification result. As described below with reference to FIGS. 23A and 23B, after a page of which page verification has failed is removed, the remaining pages are verified while being regarded as the entire document, in the entire document verification according to the present exemplary embodiment. The verification result screen 2000 illustrated in FIG. 20A1 displays that verification has been performed after the third page has been removed, as an example of the warning 2006. However, information to be displayed is not limited to this. A verification result screen 2010 is a screen for notifying the user that an entire document verification result obtained using the blockchain apparatus 111 indicates failure. Since the number of read pages 2001, the verification result 2002, the document name 2003 of a source file, the continue to verify button 2004, the end button 2005, and the warning 2006 are respectively similar to those on the verification result screen 2000, the description will be omitted.

A verification result screen 2020 is a screen for notifying the user of a page verification result of an electronic document or a paper document scanned by the ADF that is obtained using the blockchain apparatus 111. In a case where these documents are input, a plurality of pages is read at a time, and thus the verification result screen 2020 collectively displays page verification results of all pages. The number of read pages 2001, the continue to verify button 2004, and the end button 2005 are similar to those on the verification result screen 2000, and thus the description will be omitted. A result 2021 of each page displays a page verification result of each page scanned this time, on each row. In FIGS. 20A1, 20A2, 20B1, and 20B2, "SUCCESS" denotes a success and "FAILED" denotes a failure. More specifically, "SUCCESS" denotes that authenticity has been confirmed, and "FAILED" denotes that authenticity has not been confirmed. A detail button 2022 is a button for transitioning to a screen for checking the result of each page of which verification has succeeded. In the present exemplary embodiment, the screen corresponds to a verification result screen 2030. If verification has failed, a reason for the failure may be briefly indicated. In FIG. 20A1, a term "reading error" is displayed as an error display 2023. Pages to be read need not be all pages, and may be a specific page having one or more pages.

The verification result screen 2030 is a screen for notifying the user of the details of a page verification result of an electronic document or a paper document scanned by the ADF that is obtained using the blockchain apparatus 111. In this example, a screen is prepared for each page of which verification has succeeded. A read page number 2031 indicates the number of a page of which the details are displayed on this screen, among read pages, and a preview 2032 is a preview image of this page. A page number 2033 in a source file corresponds to the original document page number 1202 included in the transaction 1011 illustrated in FIG. 12B, and is acquired similarly to the document name 2003 of the source file. The verification result screen 2030 illustrated in FIG. 20A2 indicates that the number of acquired results is five. In other words, this means that the first page verified this time is a page corresponding to the fifth page in the printed original electronic document. Nevertheless, a display method is not limited to this, and different display may be performed in accordance with information included in the transaction 1011. For example, by including the number of total pages in the transaction 1011, and acquiring information regarding the number of total pages, fractional representation may be used like a corresponding page number/the number of total pages (not illustrated). A return to result list button 2034 is a button for transitioning to a screen displaying a list of results of verified pages. In the present exemplary embodiment, the screen corresponds to the verification result screen 2020.

A verification result screen 2040 is a screen for notifying the user of a success result of page verification of a paper document scanned on a platen that is obtained using the blockchain apparatus 111. As described below with reference to FIGS. 23A and 23B, in page verification of a paper document scanned on the platen, a verification result obtained using the blockchain service is displayed page by page, in the present exemplary embodiment. The verification result screen 2040 is a screen to be displayed when such a verification result is displayed, and is a screen similar to the verification result screen 2030. The document name 2003 of the source file, the page number 2031, the preview 2032, and the page number 2033 in the source file are similar to those on the verification result screen 2030, and thus the description will be omitted. A scan next page button 2041 corresponds to the continue to verify button 2004, and is a button for proceeding to verification processing of the next page. In the present exemplary embodiment, the processing is assumed to directly proceed to processing of scanning a document placed on the platen. However, a screen for prompting the user to place a document on the platen may be displayed, or pop-up display may be performed (not illustrated).

A verification result screen 2050 is a screen for notifying the user of a failure result of page verification of a paper document scanned on a platen that is obtained using the blockchain apparatus 111. A failure reason 2051 displays a reason why verification of the page has failed. On the verification result screen 2050 illustrated in FIG. 20A2, the failure reason 2051 describes that no data exists on BC. In other words, the failure reason 2051 describes that a transaction having, as a key, the page hash value 1201 extracted from embedded information does not exist. Nevertheless, display is not limited to this. The other items are similar to those on the verification result screen 2040, and thus the description will be omitted.

Verification result screens 2060, 2070, 2080, and 2090 illustrated in FIGS. 20B1 and 20B2 are screens for notifying the user of a verification result obtained using the blockchain apparatus 111, and each serve as an example of a screen to be displayed on the web browser on the PC 102. The verification result screens 2060, 2070, 2080, and 2090 are respectively similar to the verification result screens 2000, 2010, 2020, and 2030 illustrated in FIGS. 20A1 and 20A2, and thus the description will be omitted. As illustrated in verification screen 1810 in FIG. 18B, data input in a case where the image forming apparatus 101 is used via the web browser on the PC 102 is a document stored in the HDD 204, in the present exemplary embodiment. Thus, examples of screens to be displayed on the web browser on the PC 102 are omitted: the screens correspond to the verification result screens 2040 and 2050 being screens for notifying the user of a page verification result of a paper document scanned on the platen.

A flowchart illustrating processing of printing an electronic document stored in the document management apparatus 103, from the image forming apparatus 101 according to the present exemplary embodiment is similar to that in the first exemplary embodiment, and thus the description will be omitted. Nevertheless, a transaction registered in the blockchain service in S2114 is the transaction illustrated in FIGS. 12A and 12B. Specifically, each time printing is performed, one transaction corresponding to the entire printed product that is illustrated in FIG. 12A is registered, and the transaction corresponding to each page that is illustrated in FIG. 12B is registered by the number of pages.

Figure 23A:
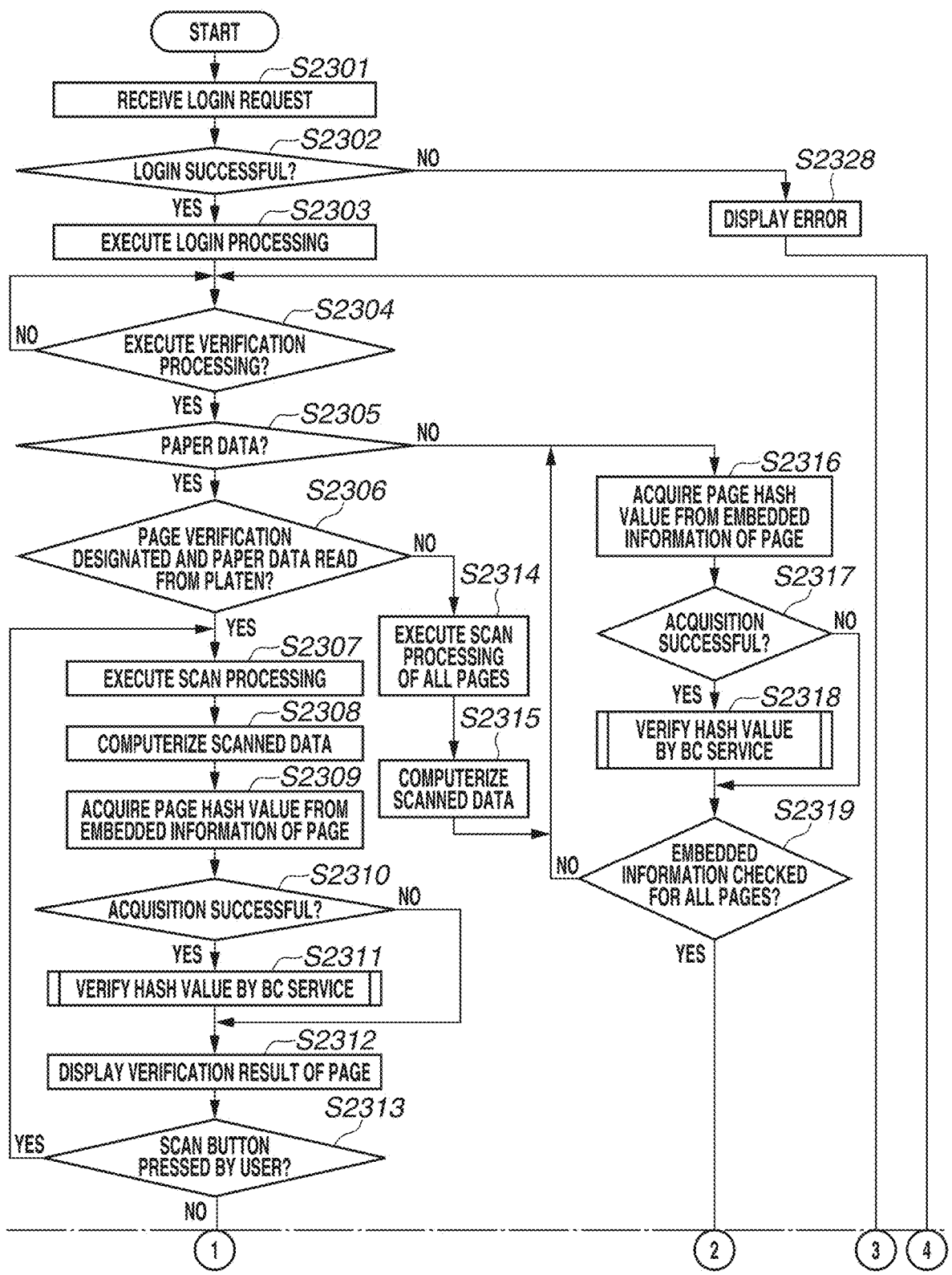
FIGS. 23A and 23B illustrate a flowchart of verifying processing of a document according to the second exemplary embodiment.
Figure 23B:
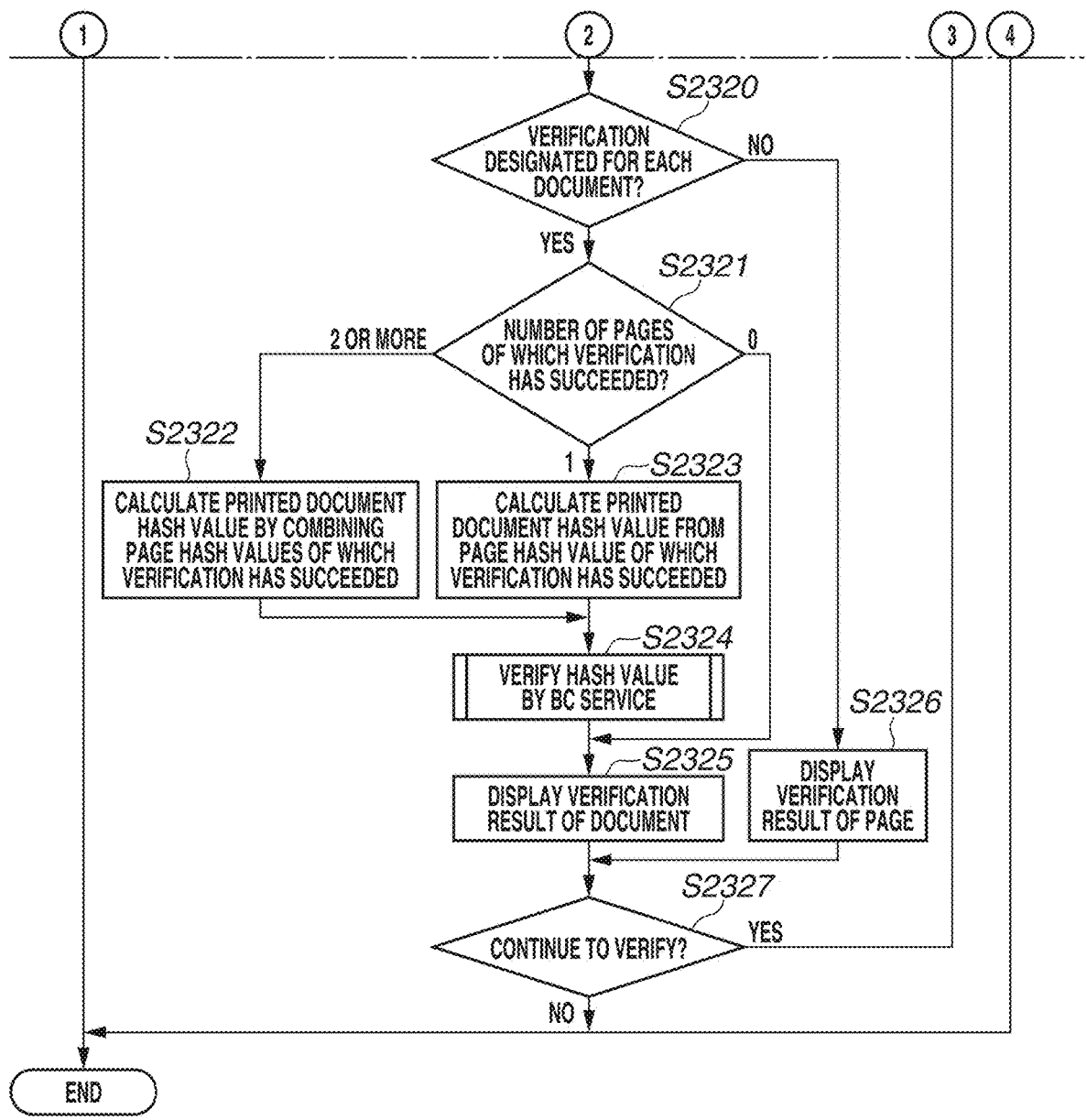

FIGS. 23A and 23B illustrate a flowchart of verifying, from the image forming apparatus 101, a document file designated by the user or a printed paper document, according to the present exemplary embodiment. The processing in this flowchart is started by the login button 1303 on the authentication screen 1300 or the guest login button 1311 on the authentication screen 1310, of the image forming apparatus 101 that are illustrated in FIGS. 13A and 13B, being pressed, and the user authentication processing unit 402 is initially executed in the CPU 201. When the processing of this flowchart is started, a user name and a password entered by the user of the image forming apparatus 101 on the authentication screen 1300 are provided to the user authentication processing unit 402. Processing in S2301 to S2304 is similar to the processing in S2201 to S2204, and thus description will be omitted.

In S2305, the application A 404 determines whether input data is paper data. If the input data is paper data (YES in S2305), the processing proceeds to S2306. If the input data is electronic data (NO in S2305), the processing proceeds to S2316. In S2306, the application A 404 determines whether an instruction selected by the user on the verification screen 1800 is page verification, and paper data is read by the scanner 211 on the platen. If these conditions are satisfied (YES in S2306), the processing proceeds to S2307. If these conditions are not satisfied (NO in S2306), the processing proceeds to S2314.

Processing in S2307 to S2310 is similar to the processing in S2206 to S2209, and thus the description will be omitted. If it is determined in S2310 that acquisition has succeeded (YES in S2310), the processing proceeds to S2311. If it is determined in S2310 that acquisition has not succeeded (NO in S2310), the processing proceeds to S2312. In S2311, the blockchain application 406 performs verification processing using transaction information recorded in the blockchain apparatus 111. The verification processing has been described with reference to FIG. 24. When the verification processing is performed, a processing type indicating verification, the page hash value acquired in S2309, and the credential information A 408 are provided. If a processing result is received as a response to a request, the processing proceeds to S2312.

In S2312, the application A 404 displays a verification result of a page. Examples of the screen to be displayed in this operation include the verification result screens 2040 and 2050 illustrated in FIGS. 20A1 and 20A2. Thereafter, in S2313, the application A 404 determines whether the user has issued an instruction to execute scanning of the next page, on the verification result screen displayed in S2312. If the user has issued an instruction to execute scanning of the next page (YES in S2313), the processing returns to S2307. If the user has issued an instruction to end the processing (NO in S2313), the processing of this flowchart ends.

In S2314, the application A 404 performs scan processing for all pages placed on the ADF. In S2315, the application A 404 computerizes the scanned image. In S2316, the application A 404 acquires a page hash value by extracting embedded information of each page that has been embedded in printing, from electronic data selected by the user in the document selection setting 1701, or electronic data obtained by computerizing paper data selected by the user in S2315.

In S2317, the application A 404 determines whether a page hash value has been acquired in S2316. If a page hash value has been acquired (YES in S2317), the processing proceeds to S2318. If a page hash value has failed to be acquired (NO in S2317), the processing proceeds to S2319. The processing in S2318 is similar to the processing in S2311, and thus the description will be omitted. In S2319, the application A 404 determines whether there is any page of which embedded information has not been checked in S2316. If there is any page of which embedded information has not been checked (NO in S2319), the processing returns to S2316. If embedded information has been checked for all pages (YES in S2319), the processing proceeds to S2320.

In S2320, the application A 404 determines whether verification designated by the user on the verification screen 1800 displayed in S2304 is entire document verification or page verification. If the user has designated entire document verification (YES in S2320), the processing proceeds to S2321. If the user has designated page verification (NO in S2320), the processing proceeds to S2326.

In S2321, the application A 404 determines the number of pages of which verification has succeeded in S2318. If the number of pages is two or more ("2 OR MORE" in S2321), the processing proceeds to S2322. If the number of pages is one ("1" in S2321), the processing proceeds to S2323. If the number of pages is zero ("0" in S2321), the processing proceeds to S2325. The processing in S2322 to S2324 is similar to the processing in S2212 to S2214 except that the processing targets page hash values of which verification has succeeded, and thus the description will be omitted. In other words, a difference from the first exemplary embodiment lies in that, while all read pages are verified as the entire document in the first exemplary embodiment, pages of which page hash values have been read and verification has succeeded are verified as the entire document, in the present exemplary embodiment.

In S2325, the application A 404 displays a result of entire document verification. Examples of the screen to be displayed in this operation include the verification result screens 2000 and 2010 illustrated in FIGS. 20A1 and 20A2, and a verification result in S2324 is displayed. In addition, a difference from the verification result screens 1900 and 1910 according to the first exemplary embodiment lies in the warning 2006. The warning 2006 is displayed based on a difference between the number of page hash values of which verification has succeeded that are used in S2322 or S2323, and the number of pages read in S2316, and a verification result in S2324. The warning 2006 to be displayed will be described using examples of several verification patterns.

Suppose a case where a correct printed product having a plurality of pages is verified in a state in which white paper is mixed in the third page. In this case, it is determined in S2317 that a page hash value of the third page has failed to be acquired, and the third page is excluded from the target of verification. The remaining pages have no problem, and thus verification in S2324 succeeds. The warning 2006 is therefore only required to indicate that "although embedded information has failed to be acquired from the third page, verification of the remaining pages has succeeded", and this is exemplified on the verification result screen 2000. Next, suppose a case where a plurality of correct printed products each having a plurality of pages is verified in a state of being mixed. In this case, verification in S2318 succeeds for all pages, but verification in S2324 fails. Thus, it can be determined that a plurality of correct printed products are mixed. The warning 2006 is therefore only required to indicate that "different documents are mixed", and this is exemplified on the verification result screen 2010. In this manner, the warning 2006 to be displayed may be determined based on transition in this flowchart or a verification result obtained by the blockchain service. A determination method of the warning 2006 to be displayed is not limited to this.

In S2326, the application A 404 displays a result of page verification. Examples of the screen to be displayed in this operation include the verification result screen 2020 illustrated in FIGS. 20A1 and 20A2, and a list of verification results of the respective pages in S2318 is displayed. In FIG. 23A, discrimination is not made between a case where acquisition has failed in S2317, and a case where verification has failed in S2318, but the discrimination may be made therebetween, and a result to be displayed is not limited to this. In addition, the verification result screen 2020 may transition to the verification result screen 2030 displaying a more detailed result, by performing an operation on the verification result screen 2020. The transition is omitted in this flowchart. The processing in S2327 and S2328 is similar to the processing in S2218 and S2219, and thus the description will be omitted. The processing of the flowchart then ends.

A flowchart illustrating transaction processing for the blockchain apparatus 111 that is performed by the blockchain application 406 of the image forming apparatus 101 according to the present exemplary embodiment is similar to that in the first exemplary embodiment, and thus the description will be omitted. Nevertheless, a transaction registered in the blockchain service in printing in S2412 is different from that in the first exemplary embodiment, and therefore information to be acquired changes in accordance with the transaction.

Figure 7:
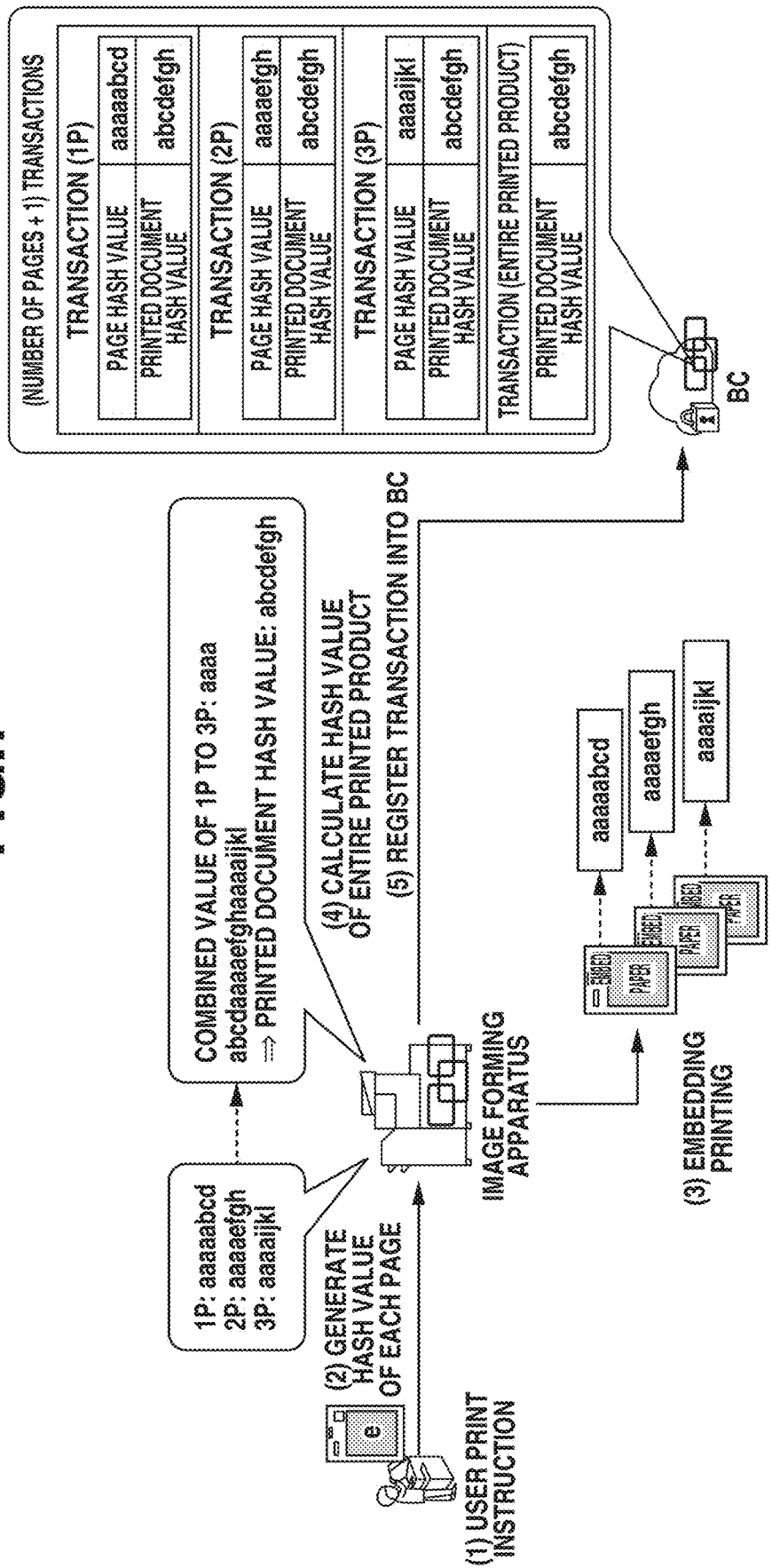
FIG. 7 is a diagram illustrating an overview according to a second exemplary embodiment.

Lastly, the overview of the present exemplary embodiment will be described with reference to FIG. 7. FIG. 7 is a diagram briefly illustrating the data configuration of the transaction 1011 illustrated in FIGS. 12A and 12B, and the flowchart in printing that is illustrated in FIG. 21. FIG. 7 illustrates that, in addition to the features of the first exemplary embodiment, embedded information corresponding to each page is regarded as one transaction, and a plurality of transactions corresponding to a set of pages, and one transaction of a hash value corresponding to the entire printed product that is calculated by combining a set of page hash values are registered.

Embedded information embedded into a printed product remains the same as that in the first exemplary embodiment.

As described above, the image forming apparatus 101 can properly use the blockchain service, according to the present exemplary embodiment. Furthermore, the verification of authenticity can be performed for a printed product having a plurality of pages. Moreover, not only the verification of authenticity of the entire document, but also the verification of authenticity of each page can be performed.

Heretofore, the description has been given of a method of confirming the authenticity of a document by calculating a printed document hash value from page hash values embedded into the respective pages to be printed, and verifying the printed document hash value as inquiry information using the blockchain service. Nevertheless, a similar effect can be obtained by changing embedded information of each page, information included in the transaction 1011, or processing in verification, without using such a printed document hash value.

Figure 8:
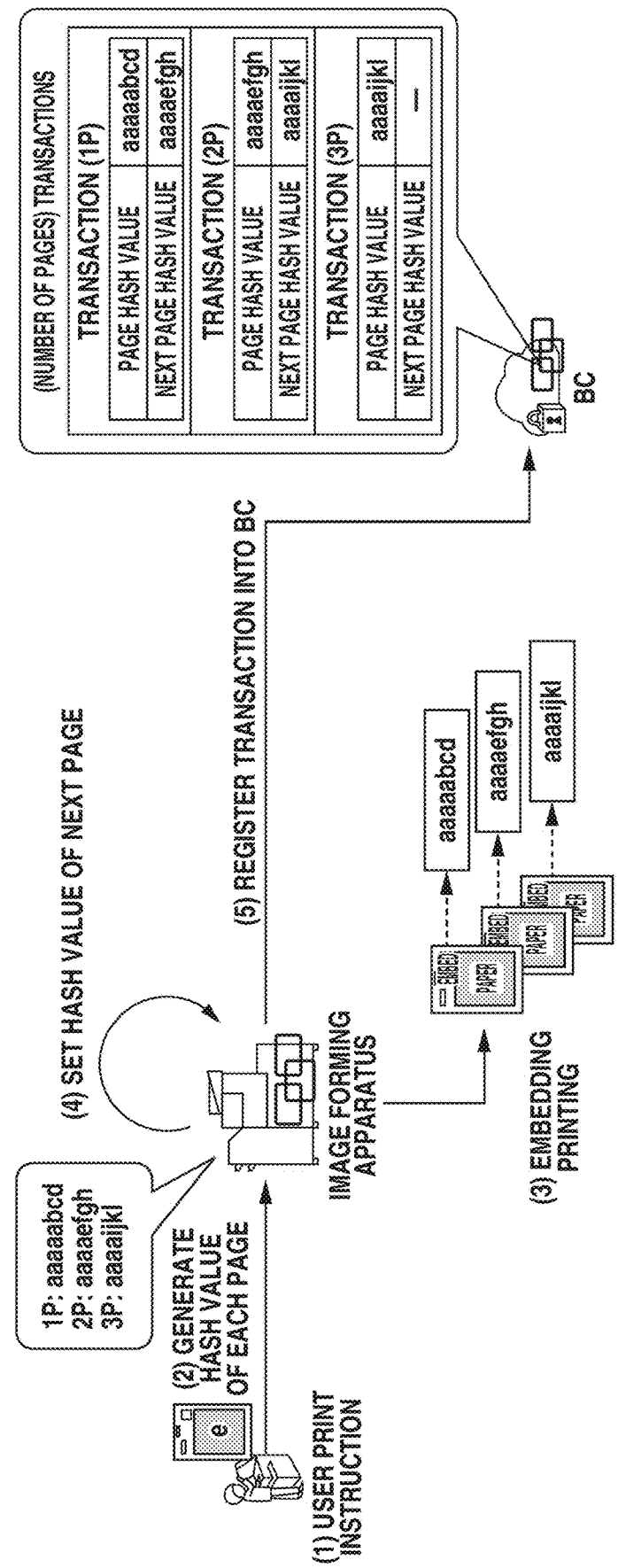
FIG. 8 is a diagram illustrating an overview according to a fourth exemplary embodiment.

In a third exemplary embodiment, a method of not using a printed document hash value will be briefly described mainly based on a difference from the second exemplary embodiment. FIG. 8 is a diagram illustrating the overview of the present exemplary embodiment. In the present exemplary embodiment, a transaction corresponding to the entire printed product like the transaction 1011 illustrated in FIG. 12A in the second exemplary embodiment is not registered. A transaction corresponding to each page like the transaction 1011 illustrated in FIG. 12B is registered, but the printed document hash value 1101 is not included as information. Instead, a next page hash value is included as information as illustrated in FIG. 8. The next page hash value is for forming a one-way linked list while regarding a page hash value of each page in a printed product as a node. In FIG. 8, a transaction (1P) includes a key page hash value of a transaction (2P), and the transaction (2P) includes a key page hash value of a transaction (3P) as next page hash values.

The next page hash value is used in entire document verification. As an example of a method thereof, it is sufficient that a next page hash value included in a transaction corresponding to each page acquired in S2318 is checked instead of calculating a printed document hash value in S2322 in the second exemplary embodiment. Specifically, if a one-way linked list is formed without deficiency or excess by page hash values of which verification has succeeded and next page hash values included in transactions, it can be determined that authenticity has been confirmed. If not, it can be determined that authenticity has not been confirmed. In other words, in a case where a page hash value acquired from embedded information of each page, of which verification has succeeded does not match any next page hash value, or in a case where a one-way linked list lacks any page hash value, it is determined that deficiency or excess exists as a document, and authenticity has not been confirmed. Page verification is similar to that in the second exemplary embodiment, and thus the description will be omitted.

In addition, different information may be included in a transaction, and verification may be accordingly performed using a different method. The configuration and the procedure are not limited to the above-described configuration procedure. For example, a bidirectional linked list may be formed by including not only a next page hash value but also a previous page hash value. Similarly to the second exemplary embodiment, information to be displayed on a verification result screen as a notification to the user may be included in a transaction, which is not illustrated in FIG. 8.

Heretofore, the third exemplary embodiment has been described as an exemplary embodiment that has a configuration different from the second exemplary embodiment in information included in a transaction, and a verification method, and brings about a similar effect.

In the second and third exemplary embodiments, the description has been given of a method of enabling entire document verification and page verification by embedding a page hash value into each page to be printed, and registering a transaction corresponding to each page. Alternatively, it is possible to obtain a similar effect without registering a transaction corresponding to each page by adding new information to embedded information of each page.

Figure 9:
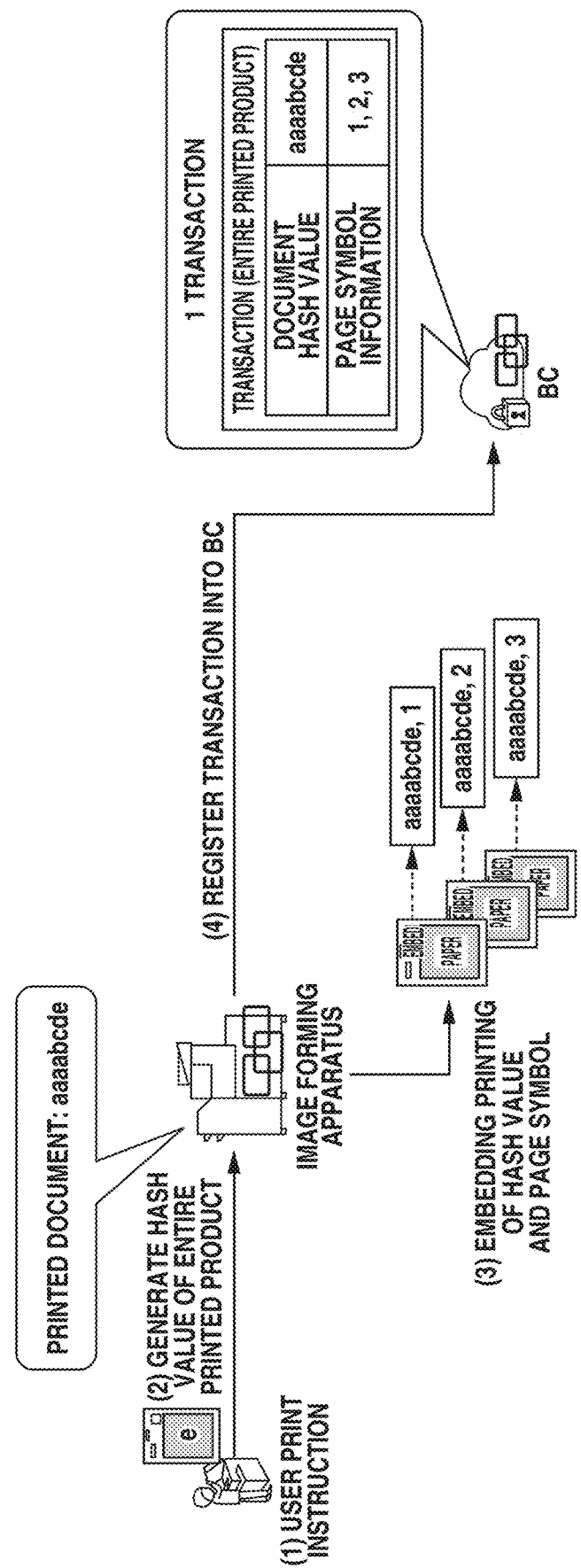
FIG. 9 is a diagram illustrating an overview according to a first exemplary embodiment.

As a fourth exemplary embodiment, a method of enabling entire document verification and page verification by adding new information to embedded information, and registering only a transaction corresponding to the entire printed product will be briefly described mainly based on a difference from the second exemplary embodiment. FIG. 9 is a diagram illustrating the overview of the present exemplary embodiment. In the present exemplary embodiment, one hash value (hereinafter, document hash value) unique to a printed document is generated in printing, a page symbol unique in the printed document is allocated to each page, and these two items are printed as embedded information of each page. In other words, embedded information of each page of a certain printed product includes a common document hash value and a unique page symbol. In FIG. 9, page symbols are sequence numbers like 1, 2, and 3, but the page symbols are not limited to these because a page symbol is only required to be a symbol unique to each page.

In the present exemplary embodiment, a transaction corresponding to each page like the transaction 1011 illustrated in FIG. 12B in the second exemplary embodiment is not registered. A transaction corresponding to the entire printed product like the transaction 1011 illustrated in FIG. 12A is registered, and a list of unique symbols embedded into the respective pages is included as page symbol information. In other words, a transaction to be registered becomes similar to that in the first exemplary embodiment.

The page symbol information is used both in entire document verification and page verification. As an example of a method of entire document verification, it is sufficient that a page symbol acquired from embedded information of each page is compared with page symbol information included in a transaction, and whether deficiency or excess exists is determined. Specifically, a document hash value and a page symbol are acquired in S2316 of the second exemplary embodiment. In S2322, it is then confirmed that a document hash value acquired from each page is common, instead of calculating a printed document hash value. Thereafter, in a case where page symbol information included in a transaction acquired using the document hash value as a key is identical to acquired symbols of the respective pages, it can be determined that authenticity has been confirmed. If not, it can be determined that authenticity has not been confirmed. In other words, in a case where a page having a different hash value is mixed, in a case where a page symbol not included in page symbol information is mixed, or in a case where a page symbol included in page symbol information has failed to be acquired, it is determined that deficiency or excess exists as a document and authenticity has not been confirmed.

As an example of a method of page verification, it is sufficient that whether a document hash value and a page symbol that have been acquired from embedded information of a page are included in a transaction is checked. Specifically, a page symbol is also acquired in S2309 or S2316, and thereafter, page symbol information is acquired from the blockchain service as information in a transaction in S2311. After that, if a page symbol acquired from embedded information of the page is included in page symbol information in the transaction, it may be determined that authenticity of the page has been confirmed. In other words, in a case where a page symbol has failed to be acquired from embedded information, in a case where verification of a hash value in the blockchain service has failed, or in a case where the acquired page symbol is not included in page symbol information, it is determined that authenticity has not been confirmed. Nevertheless, a procedure of verification and the configuration of the transaction are not limited to these. Different information may be included in the transaction. For example, similarly to the second exemplary embodiment, information to be displayed on a verification result screen as a notification to the user may be included in a transaction, which is not illustrated in FIG. 9.

Heretofore, the fourth exemplary embodiment has been described as an exemplary embodiment that has a configuration different from the second exemplary embodiment in information included in a transaction, and a verification method, and brings about a similar effect.

An exemplary embodiment can also be implemented by processing of supplying a program for executing one or more functions of the above-described exemplary embodiment, to a system or an apparatus via a network or a storage medium, and one or more processors in a computer of the system or the apparatus reading out and executing the program. An exemplary embodiment can also be implemented by a circuit (e.g., an application specific integrated circuit (ASIC)) for executing one or more functions.

According to the above-described exemplary embodiment, an image forming apparatus cooperating with a blockchain service is prepared, and authenticity can be guaranteed using the blockchain service for a printed product having a plurality of pages.

Other Embodiments

Some embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-206317, which was filed on Dec. 11, 2020 and which is hereby incorporated by reference herein in its entirety.

What is claimed is:

1. An image forming apparatus cooperating with a management service for receiving a document via a network and storing the document, cooperating with a blockchain service for managing information regarding the document in a block unit and for managing a plurality of blocks at a plurality of nodes after defining a respective relation with a previous and/or subsequent block for each block, the image forming apparatus comprising:
   a printing unit configured to output a printed product; and
   one or more processors and one or more memories that cooperate to
      generate, when a document stored in the management service is printed, embedded information for uniquely identifying a page, for each page of the document, and further generate an embedded image from the embedded information,
      wherein the printing unit is configured to output the printed product by performing printing while embedding the embedded image into each page of the document;
      register information regarding the printed product in the blockchain service based on a set of pieces of the embedded information; and
      verify whether the printed product is a correct printed product by
         extracting embedded information by obtaining image data from a scanner that the scanner generated by scanning the printed product and analyzing the embedded image in the image data, and
         inquiring of the blockchain service about information regarding the printed product based on the embedded information.

2. The image forming apparatus according to claim 1, wherein the one or more processors and the one or more memories further cooperate to resister document identification information uniquely generated from the set of pieces of the embedded information, and
   wherein the one or more processors and the one or more memories further cooperate to register verify whether the printed product is a correct printed product, by extracting embedded information by scanning the printed product placed on the image forming apparatus and analyzing the embedded image, generating the document identification information from the set of pieces of the embedded information, and checking whether information regarding the printed product is registered in the blockchain service using the document identification information, and
   wherein the one or more processors and the one or more memories further cooperate to notify a user of a verification result.

3. The image forming apparatus according to claim 2, wherein, in a case where embedded information of at least one page has failed to be extracted from the printed product, the one or more processors and the one or more memories further cooperate to identify a page of which embedded information has failed to be acquired, and notify a user of the page.

4. The image forming apparatus according to claim 3, wherein the one or more processors and the one or more memories further cooperate to extract embedded information obtained by scanning a specific page having one or a plurality of pages of the printed product, analyzing an embedded image, and verifying whether the specific page of the printed product is a correct page, and by inquiring of the blockchain service about information regarding the specific page based on the embedded information of the specific page, and
   wherein the one or more processors and the one or more memories further cooperate to notify a user of a verification result.

5. The image forming apparatus according to claim 4, wherein a verification method for verifying the specific page varies between a case where the printed product is scanned using an automatic document feeder (ADF) of the image forming apparatus, and a case where the printed product is scanned on a platen of the image forming apparatus.

6. The image forming apparatus according to claim 5, wherein, in a case where the printed product is scanned on a platen of the image forming apparatus, the one or more processors and the one or more memories further cooperate to make an inquiry to the blockchain service each time the embedded information is acquired from a page placed on the platen, and
   wherein the one or more processors and the one or more memories further cooperate to notify a user of a verification result, each time an inquiry is made.

7. The image forming apparatus according to claim 5, wherein, in a case where the printed product is scanned using the ADF of the image forming apparatus, the one or more processors and the one or more memories further cooperate to extract the embedded information from each page of the printed product, make an inquiry to the blockchain service after extracting all pieces of the embedded information, and notify a user of a verification result.

8. The image forming apparatus according to claim 4, wherein verification of the printed product or verification of the specific page is performed in accordance with user designation.

9. A control method of an image forming apparatus cooperating with a management service for receiving a document via a network and storing the document, cooperating with a blockchain service for managing information regarding the document in a block unit, and managing a plurality of blocks at a plurality of nodes after defining relation with a previous and/or subsequent block for each block, wherein the control method is performed by one or more processors controlling the image forming apparatus, the control method comprising:

generating, when a document stored in the management service is printed, embedded information for uniquely identifying a page, for each page of the document, and further generating an embedded image from the embedded information;

controlling a printing unit to output a printed product by performing printing while embedding the embedded image into each page of the document;

registering information regarding the printed product in the blockchain service based on a set of pieces of the embedded information; and verifying whether the printed product is a correct printed product by extracting embedded information by controlling a scanner to scan the printed product and by decrypting the embedded image, and inquiring of the blockchain service about information regarding the printed product based on the embedded information.

10. A non-transitory computer-readable medium storing instructions of an image forming apparatus cooperating with a management service for receiving a document via a network and storing the document, cooperating with a blockchain service for managing information regarding the document in a block unit, and managing a plurality of blocks at a plurality of nodes after defining relation with a previous and/or subsequent block for each block, the instructions, when executed by a computer, causing the computer to execute a control method comprising:

generating, when a document stored in the management service is printed, embedded information for uniquely identifying a page, for each page of the document, and further generating an embedded image from the embedded information;

outputting a printed product by performing printing while embedding the embedded image into each page of the document;

registering information regarding the printed product in the blockchain service based on a set of pieces of the embedded information; and verifying whether the printed product is a correct printed product by extracting embedded information by scanning the printed product and decrypting the embedded image, and inquiring of the blockchain service about information regarding the printed product based on the embedded information.

* * * * *